US008144415B2

(12) United States Patent
Sawaguchi et al.

(10) Patent No.: US 8,144,415 B2
(45) Date of Patent: *Mar. 27, 2012

(54) APPARATUS, SIGNAL-PROCESSING CIRCUIT AND DEVICE FOR MAGNETIC RECORDING SYSTEM

(75) Inventors: Hideki Sawaguchi, Kokubunji (JP); Yasutaka Nishida, Kodaira (JP); Hisashi Takano, Kodaira (JP); Hiroyuki Tsuchinaga, Kodaira (JP)

(73) Assignee: Hitachi Global Storage Technologies Japan, Ltd., Kanagawa-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/923,307

(22) Filed: Sep. 14, 2010

(65) Prior Publication Data
US 2011/0013306 A1 Jan. 20, 2011

Related U.S. Application Data

(63) Continuation of application No. 12/232,435, filed on Sep. 17, 2008, now Pat. No. 7,817,367, which is a continuation of application No. 09/940,475, filed on Aug. 29, 2001, now Pat. No. 7,502,189.

(30) Foreign Application Priority Data

Oct. 23, 2000 (JP) .................................. 2000-328404

(51) Int. Cl.
*G11B 5/35* (2006.01)
(52) U.S. Cl. ................ 360/65; 360/25; 360/29; 360/30; 360/44; 360/45

(58) Field of Classification Search .................. None
See application file for complete search history.

(56) References Cited

U.S. PATENT DOCUMENTS 4,571,734 A * 2/1986 Dolivo et al. ................. 375/291
5,459,679 A 10/1995 Ziperovich
(Continued)

FOREIGN PATENT DOCUMENTS

JP 11-66755 3/1999

OTHER PUBLICATIONS

Webster's New World Dictionary, Third College Edition, p. 1346++.

*Primary Examiner* — Dismery Mercedes
(74) *Attorney, Agent, or Firm* — Stites & Harbison, PLLC; Juan Carlos A. Marquez, Esq

(57) ABSTRACT

To effectively suppress a signal in a low frequency region in which the medium noise and the signal distortion are concentrated, and in order to effectively utilize a detected component of the reproduced signal in the low frequency region, a target of partial response equalization to the perpendicularly recorded/reproduced signal is set so that the low-frequency component around the direct current is suppressed to a regulated quantity for both the effective suppression and the effective utilization. Accordingly, a maximum-likelihood decoding process is carried out through the target of partial response equalization. Reliability of data detection is made higher and a signal-to-noise ratio is improved, so that the noise from the recording medium can be reduced more and it is possible to provide a high-density magnetic recording/reproducing apparatus.

52 Claims, 16 Drawing Sheets

U.S. PATENT DOCUMENTS

| | | | |
|---|---|---|---|
| 5,539,588 A | 7/1996 | Sawaguchi et al. | |
| 5,581,568 A | 12/1996 | Togami | |
| 5,583,705 A | 12/1996 | Ziperovich et al. | |
| 5,583,706 A * | 12/1996 | Dudley et al. | 360/46 |
| 5,650,954 A * | 7/1997 | Minuhin | 708/819 |
| 5,784,415 A * | 7/1998 | Chevillat et al. | 375/341 |
| 5,790,335 A | 8/1998 | Sugawara et al. | |
| 5,838,735 A | 11/1998 | Khullar | |
| 5,889,823 A * | 3/1999 | Agazzi et al. | 375/341 |
| 5,986,987 A | 11/1999 | Taguchi et al. | |
| 6,025,965 A | 2/2000 | Ziperovich | |
| 6,104,766 A * | 8/2000 | Coker et al. | 375/341 |
| 6,208,477 B1 | 3/2001 | Cloke et al. | |
| 6,262,857 B1 | 7/2001 | Hull et al. | |
| 6,275,458 B1 * | 8/2001 | Wong et al. | 369/47.19 |
| 6,304,402 B1 | 10/2001 | Nishida et al. | |
| 6,337,889 B1 * | 1/2002 | Mita et al. | 375/341 |
| 6,359,744 B1 * | 3/2002 | Mallary | 360/40 |
| 6,377,416 B1 | 4/2002 | Kikuta | |
| 6,445,662 B1 | 9/2002 | Tonami | |
| 6,449,110 B1 | 9/2002 | DeGroat et al. | |
| 6,501,610 B1 | 12/2002 | Sugawara et al. | |
| 6,549,352 B1 | 4/2003 | Uno et al. | |
| 6,594,094 B2 | 7/2003 | Rae et al. | |
| 6,625,235 B1 * | 9/2003 | Coker et al. | 375/341 |
| 6,671,112 B2 | 12/2003 | Murakami et al. | |
| 6,741,412 B2 | 5/2004 | Sawaguchi et al. | |
| 6,762,895 B2 | 7/2004 | Osafune | |
| 6,909,385 B2 * | 6/2005 | Vasic et al. | 341/102 |
| 6,912,100 B2 * | 6/2005 | Sawaguchi et al. | 360/45 |
| 7,024,617 B2 * | 4/2006 | Sawaguchi et al. | 714/794 |
| 7,116,504 B1 | 10/2006 | Oberg | |
| 7,123,430 B2 | 10/2006 | Musungu et al. | |
| 7,817,367 B2 * | 10/2010 | Sawaguchi et al. | 360/65 |
| 2002/0012185 A1 | 1/2002 | Sawaguchi et al. | |
| 2003/0152175 A1 * | 8/2003 | Kuki et al. | 375/350 |

* cited by examiner

| α | n=4 (a1,a2,a3,a4) | n=5 (a1,a2,a3,a4,a5) |
|---|---|---|
| 0 | (1.0 0.81 0.18 0.0) | (1.0 0.81 0.20 0.024 0.0) |
| 0.1 | (1.0 0.80 0.15 −0.024) | (1.0 0.81 0.20 0.019 −0.0048) |
| 0.2 | (1.0 0.78 0.11 −0.062) | (1.0 0.81 0.19 0.0063 −0.017) |
| 0.3 | (1.0 0.76 0.051 −0.11) | (1.0 0.81 0.18 −0.021 −0.039) |
| 0.4 | (1.0 0.72 −0.027 −0.17) | (1.0 0.79 0.15 −0.066 −0.074) |
| 0.5 | (1.0 0.67 −0.12 −0.23) | (1.0 0.77 0.099 −0.13 −0.12) |
| 0.6 | (1.0 0.60 −0.23 −0.29) | (1.0 0.74 0.027 −0.22 −0.17) |
| 0.7 | (1.0 0.53 −0.34 −0.36) | (1.0 0.69 −0.068 −0.31 −0.22) |
| 0.8 | (1.0 0.44 −0.47 −0.42) | (1.0 0.62 −0.18 −0.42 −0.28) |
| 0.9 | (1.0 0.35 −0.59 −0.48) | (1.0 0.54 −0.31 −0.53 −0.32) |
| 1 | (1.0 0.25 −0.72 −0.54) | (1.0 0.45 −0.46 −0.63 −0.36) |

K=1.0

| α | n=4 (a1,a2,a3,a4) | n=5 (a1,a2,a3,a4,a5) |
|---|---|---|
| 0 | (1.0 1.08 0.35 0.0) | (1.0 1.11 0.44 0.086 0.0) |
| 0.1 | (1.0 1.06 0.29 −0.041) | (1.0 1.11 0.43 0.069 −0.012) |
| 0.2 | (1.0 1.03 0.22 −0.093) | (1.0 1.11 0.41 0.037 −0.034) |
| 0.3 | (1.0 0.98 0.12 −0.15) | (1.0 1.10 0.38 −0.014 −0.068) |
| 0.4 | (1.0 0.92 0.016 −0.22) | (1.0 1.07 0.32 −0.087 −0.11) |
| 0.5 | (1.0 0.85 −0.10 −0.29) | (1.0 1.04 0.24 −0.18 −0.16) |
| 0.6 | (1.0 0.78 −0.23 −0.36) | (1.0 0.99 0.14 −0.29 −0.22) |
| 0.7 | (1.0 0.69 −0.37 −0.42) | (1.0 0.93 0.014 −0.41 −0.28) |
| 0.8 | (1.0 0.60 −0.51 −0.49) | (1.0 0.86 −0.13 −0.54 −0.33) |
| 0.9 | (1.0 0.51 −0.65 −0.56) | (1.0 0.77 −0.29 −0.67 −0.38) |
| 1 | (1.0 0.41 −0.79 −0.62) | (1.0 0.67 −0.45 −0.80 −0.43) |

| α | n=4 (a1,a2,a3,a4) | n=5 (a1,a2,a3,a4,a5) |
|---|---|---|
| 0 | (1.0 1.32 0.52 0.0) | (1.0 1.43 0.77 0.20 0.0) |
| 0.1 | (1.0 1.28 0.42 −0.056) | (1.0 1.42 0.75 0.15 −0.024) |
| 0.2 | (1.0 1.22 0.32 −0.12) | (1.0 1.40 0.70 0.090 −0.059) |
| 0.3 | (1.0 1.16 0.19 −0.19) | (1.0 1.38 0.63 0.0044 −0.10) |
| 0.4 | (1.0 1.08 0.059 −0.26) | (1.0 1.34 0.53 −0.10 −0.16) |
| 0.5 | (1.0 1.00 −0.082 −0.33) | (1.0 1.29 0.42 −0.23 −0.21) |
| 0.6 | (1.0 0.92 −0.23 −0.41) | (1.0 1.23 0.28 −0.37 −0.27) |
| 0.7 | (1.0 0.83 −0.38 −0.48) | (1.0 1.15 0.12 −0.51 −0.33) |
| 0.8 | (1.0 0.73 −0.53 −0.55) | (1.0 1.07 −0.052 −0.66 −0.39) |
| 0.9 | (1.0 0.63 −0.68 −0.63) | (1.0 0.98 −0.23 −0.82 −0.45 |
| 1 | (1.0 0.53 −0.84 −0.70) | (1.0 0.88 −0.42 −0.96 −0.50) |

K=1.4

| α | n=4 (a1,a2,a3,a4) | n=5 (a1,a2,a3,a4,a5) |
|---|---|---|
| 0 | (1.0 1.50 0.65 0.0) | (1.0 1.72 1.15 0.33 0.0) |
| 0.1 | (1.0 1.44 0.52 −0.068) | (1.0 1.70 1.08 0.25 −0.038) |
| 0.2 | (1.0 1.37 0.39 −0.14) | (1.0 1.66 0.99 0.15 −0.085) |
| 0.3 | (1.0 1.29 0.24 −0.22) | (1.0 1.62 0.88 0.027 −0.14) |
| 0.4 | (1.0 1.20 0.092 −0.29) | (1.0 1.57 0.74 −0.11 −0.20) |
| 0.5 | (1.0 1.11 −0.065 −0.37) | (1.0 1.50 0.59 −0.27 −0.26) |
| 0.6 | (1.0 1.02 −0.22 −0.45) | (1.0 1.43 0.41 −0.43 −0.33) |
| 0.7 | (1.0 0.93 −0.38 −0.53) | (1.0 1.35 0.23 −0.60 −0.39) |
| 0.8 | (1.0 0.83 −0.55 −0.60) | (1.0 1.26 0.032 −0.78 −0.45) |
| 0.9 | (1.0 0.73 −0.71 −0.68) | (1.0 1.16 −0.17 −0.95 −0.51) |
| 1 | (1.0 0.63 −0.87 −0.76) | (1.0 1.06 −0.37 −1.12 −0.57) |

| α | n=4 (a1,a2,a3,a4) | n=5 (a1,a2,a3,a4,a5) |
|---|---|---|
| 0 | (1.0 1.63 0.74 0.0) | (1.0 1.97 1.50 0.47 0.0) |
| 0.1 | (1.0 1.55 0.59 -0.076) | (1.0 1.93 1.40 0.35 -0.051) |
| 0.2 | (1.0 1.47 0.44 -0.15) | (1.0 1.88 1.25 0.21 -0.108) |
| 0.3 | (1.0 1.38 0.28 -0.23) | (1.0 1.82 1.10 0.047 -0.17) |
| 0.4 | (1.0 1.29 0.12 -0.32) | (1.0 1.75 0.92 -0.12 -0.24) |
| 0.5 | (1.0 1.20 -0.051 -0.40) | (1.0 1.68 0.74 -0.30 -0.30) |
| 0.6 | (1.0 1.10 -0.22 -0.48) | (1.0 1.59 0.53 -0.49 -0.37) |
| 0.7 | (1.0 1.00 -0.39 -0.56) | (1.0 1.50 0.33 -0.68 -0.44) |
| 0.8 | (1.0 0.90 -0.56 -0.64) | (1.0 1.41 0.11 -0.87 -0.51) |
| 0.9 | (1.0 0.80 -0.73 -0.72) | (1.0 1.31 -0.11 -1.06 -0.57) |
| 1 | (1.0 0.70 -0.90 -0.80) | (1.0 1.21 -0.33 -1.25 -0.64) |

K=1.8

| α | n=4 (a1,a2,a3,a4) | n=5 (a1,a2,a3,a4,a5) |
|---|---|---|
| 0 | (1.0 1.71 0.80 0.0) | (1.0 1.97 1.50 0.47 0.0) |
| 0.1 | (1.0 1.62 0.64 -0.081) | (1.0 1.93 1.40 0.35 -0.051) |
| 0.2 | (1.0 1.53 0.47 -0.16) | (1.0 1.88 1.25 0.21 -0.108) |
| 0.3 | (1.0 1.44 0.30 -0.25) | (1.0 1.82 1.10 0.047 -0.17) |
| 0.4 | (1.0 1.35 0.13 -0.33) | (1.0 1.75 0.92 -0.12 -0.24) |
| 0.5 | (1.0 1.25 -0.041 -0.42) | (1.0 1.68 0.74 -0.30 -0.30) |
| 0.6 | (1.0 1.15 -0.22 -0.50) | (1.0 1.59 0.53 -0.49 -0.37) |
| 0.7 | (1.0 1.05 -0.39 -0.59) | (1.0 1.50 0.33 -0.68 -0.44) |
| 0.8 | (1.0 0.96 -0.57 -0.67) | (1.0 1.41 0.11 -0.87 -0.51) |
| 0.9 | (1.0 0.86 -0.74 -0.75) | (1.0 1.31 -0.11 -1.06 -0.57) |
| 1 | (1.0 0.76 -0.92 -0.84) | (1.0 1.21 -0.33 -1.25 -0.64) |

VALUES OF PARTIAL RESPONSE INTERSYMBOL INTERFERENCE SET IN THE ONE OF EMBODIMENTS OF THE INVENTION (K=1.6,1.8)

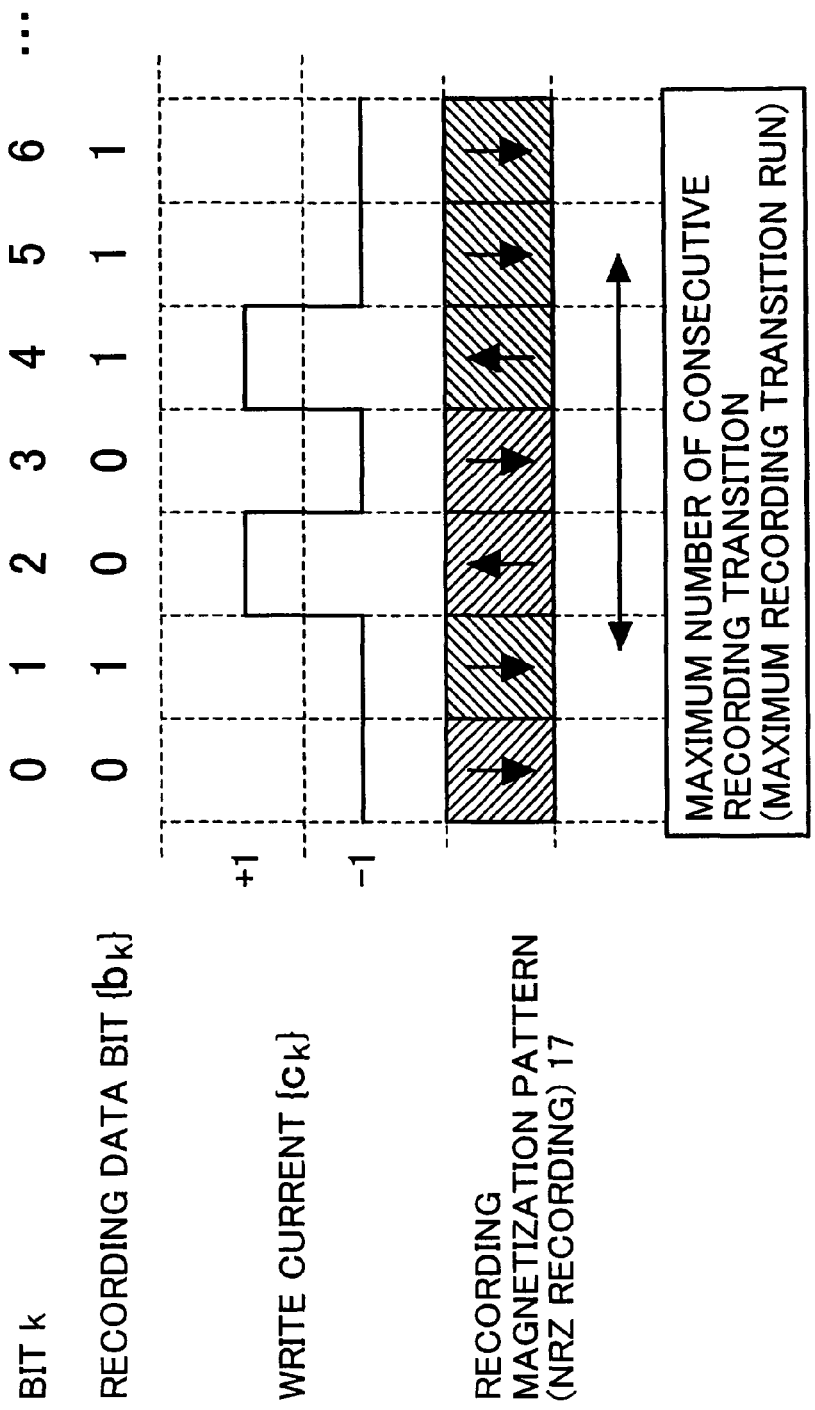

APPARATUS, SIGNAL-PROCESSING CIRCUIT AND DEVICE FOR MAGNETIC RECORDING SYSTEM

CROSS-REFERENCE TO RELATED APPLICATION

This application is a Continuation application of U.S. application Ser. No. 12/232,435 filed on Sep. 17, 2008 now U.S. Pat. No. 7,817,367, which is a Continuation application of U.S. application Ser. No. 09/940,475 filed on Aug. 29, 2001 now U.S. Pat. No. 7,502,189. Priority is claimed based on U.S. application Ser. No. 12/232,435 filed on Sep. 17, 2008, which claims the priority of U.S. application Ser. No. 09/940,475 filed on Aug. 29, 2001, which claims the priority of Japanese Patent Application No. 2000-328404 filed on Oct. 23, 2000, all of which is incorporated by reference.

BACKGROUND OF THE INVENTION

The present invention relates to a magnetically recorded/reproduced apparatus for a perpendicular magnetic recording.

Researches are being made into perpendicular magnetic recording as being adequate for a high-density magnetic recording system. A combination of a single-pole-type write head and a double-layered film medium comprised of a soft underlayer and a recording magnetic layer is often used in the perpendicular magnetic recording because of an intensive and steep recording magnetic field generated by a recording head. When magnetized information is reproduced by a reproducing head from a perpendicular magnetic recording medium subjected to magnetized recording, a reproduced signal from the head has a rectangular-shaped signal waveform corresponding to the magnetized recording pattern. A signal processing system adapted for data detection of the reproduced signal by perpendicular magnetic recording system is heretofore unknown well, but several techniques such as the partial response class I used in an optical recording/reproducing apparatus or the like, an extended partial response equalization system thereof (see JP-A-11-66755 laid-open on Mar. 9, 1999) and a technique similar to integral signal detection have been already proposed for an optical recording system or the like because the reproduced signal by perpendicular recording system contains a large amount of Dc signal component and is formed into a rectangular-shaped waveform.

Partial Response Equalization is a signal processing technique generally and widely used for an in-plane magnetic recording system. The Partial Response Equalization performs signal processing system in combination with a Maximum-Likelihood decoding system so that the signal-to-noise ratio of the reproduced signal can be improved and the data reproduction can be performed with high reliability.

SUMMARY OF THE INVENTION

As described above, a large quantity of DC and low frequency components are contained in the reproduced signal waveform from the perpendicular magnetic recording system. In a practical circuit system for reproduced signal processing, a reproduction amplifier and an automatic gain controller (hereinafter, abbreviated to AGC) are set up at a front end of the circuit system. The reproduction amplifier and the AGC have a cut-off characteristic of low-frequency components around a DC component. Accordingly, the reproduced signal waveform suffers distortions in DC amplitude components and variations in signal base line.

Meanwhile, the DC component and the low frequency region around the DC component of the reproduced signal contains noise and distortion called medium noise a lot. The power spectrum of the noise/distortion has an energy distribution concentrated in the low frequency region around the DC component. Accordingly, even if low-frequency compensation is carried out simply for the reproduced signal, the signal-to-noise ratio deteriorates because the noise component is also amplified. The noise contained in the DC component is not considered at all in the partial response class I or the extended system thereof (see JP-A-11-66755), and the integral signal detection system, because such systems are designed for signal processing with the DC component remaining as it is.

It is therefore an object of the present invention to provide a signal processing system more suitable for the reproduced waveform in the perpendicular magnetic recording system.

As described above, the reproduced signal in the perpendicular magnetic recording system has a signal containing a DC component a lot. On the other hand, many disturbance factors such as various kinds of noise from the recording medium, distortion due to low-frequency loss in the signal transmission channel including a signal reproduction amplifier circuit or the like localized in the vicinity of the DC component.

In order to reduce the influence of the low-frequency disturbance factors, equalization is performed to give a frequency characteristic to the signal transmission channel such that an optimal quantity of the low-frequency components around the DC component of the reproduced signal can be passed. By performing such equalization, the influence of medium noise and waveform distortion in the vicinity of the low frequency is suppressed moderately so that the detected components of the perpendicularly recorded/reproduced signal contained in the low frequency region around the DC are retained optimally. At the same time, in order to suppress equalization enhancement of high-frequency white noise on the reproduced signal generated from the apparatus, head or circuit device, partial response equalization is performed on the equalized waveform so that the noise inputted to a maximum-likelihood detector is subjected to whitening and the maximum-likelihood data detection is performed in the post-stage. By performing equalization of the reproduced signal as described above, data error rate performance of the maximum-likelihood detector is improved.

Transfer function (inpulse response) for the partial response equalization having the above-mentioned effect is specifically expressed in the following polynomial by use of a 1 bit-delay operator D.

$$(p_1 + p_2 D + p_3 D^2 + \ldots + p_n D^{n-1})(1-\alpha D)$$

The first term of the polynomial means that intersymbol interference with real number values $p_1, p_2, \ldots p_n$ in impulse response of equalization is given as an n-bit consecutive signal sample. By appropriately giving the intersymbol interference to the impulse response waveform in the recording/reproducing system, noise-whitening filtering which reduces enhancement of the high-frequency noise component can be performed.

Further, the second term $(1-\alpha D)$ ($\alpha$ is a value of a real number in a range of $0 \leq \alpha \leq 1$) corresponds to a low-frequency suppression process. This process means that a differential between the processed signal and a signal value which is obtained by increasing to $\alpha$ times of a signal 1 bit time before the processed signal is taken. Here, if $\alpha$ is selected to be 1, the process provides a frequency characteristic which completely cuts off the DC component correspondingly to a digital differential process.

According to the present invention, by selecting the parameter α to be an appropriate value, the low-frequency component is intentionally suppressed. Hence, the ratio of suppression is desirably adjusted by selection of the parameter α. According to the present invention, the partial response equalization having the above-mentioned two functions is performed, and the equalization system suppressing both the influence of noise/distortion localized in the low frequency region and the increase of the high-frequency equalized noise and the maximum-likelihood data detection process attended with the equalization system are performed. Accordingly, highly reliable data detection for the reproduced signal in the perpendicular magnetic recording system is realized.

BRIEF DESCRIPTION OF THE DRAWINGS

FIG. 5 is a table showing an example of partial response intersymbol interference set in the present invention;

FIG. 6 is a table showing another example of the partial response intersymbol interference set in the present invention;

FIG. 7 is a table showing a further example of the partial response intersymbol interference set in the present invention;

FIG. 16 is a diagram (of an example of m=4) for explaining a recording bit conversion process according to the present invention.

DETAILED DESCRIPTION OF THE EMBODIMENTS

Embodiment 1

Figure 1:
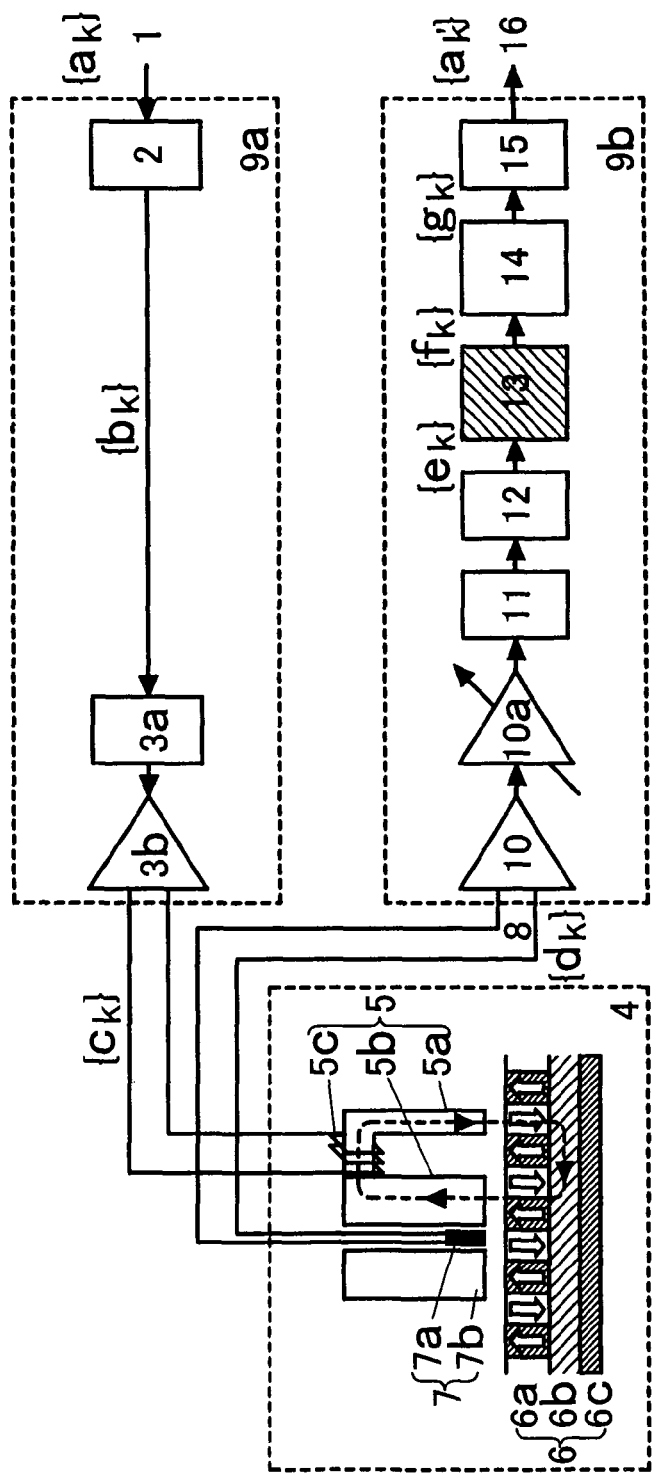
FIG. 1 is a diagram showing a fundamental embodiment, that is, a first embodiment of the present invention.

FIG. 1 is a fundamental configuration of an embodiment of a magnetic recording/reproducing apparatus according to the present invention. In the embodiment, information bit data 1 $\{a_k\}$ (k is an integer indicating a bit time) supplied to a recording signal processing circuit 9a is subjected to predetermined bit conversion by a coder 2 into recording bit data $\{b_k\}$. The recording bit data $\{b_k\}$ is converted into an analog write current $\{c_k\}$ via a write current converting circuit 3a and a write amplifier 3b. Then, the analog write current $\{c_k\}$ is supplied to a perpendicular magnetic recording head medium system 4 so that information recording is performed in the perpendicular magnetic recording head medium system 4.

Figure 2:
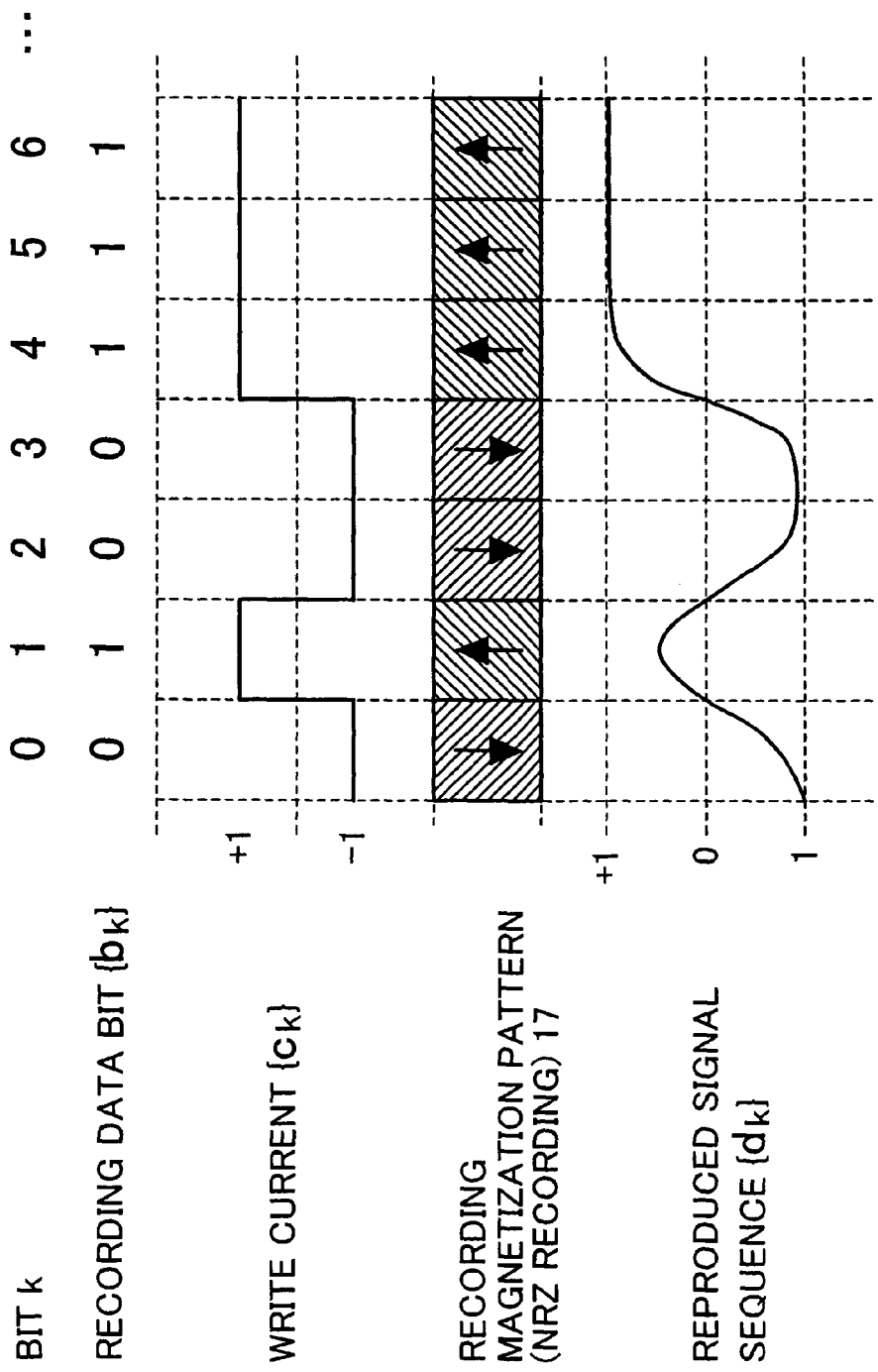
FIG. 2 is a diagram showing a recording/reproducing process of a perpendicular magnetic recording system.

The perpendicular magnetic recording head medium system 4 comprises a recording head 5, a recording medium 6 and a reproducing head 7. The recording medium 6 is made of a double-layer perpendicular magnetic recording medium which has a recording magnetic layer 6a, a soft magnetic underlayer 6b and a substrate 6c having the recording magnetic layer 6a and the soft magnetic underlayer 6b formed thereon. The recording head 5 is a single-pole-type head including a main pole 5a and a coil 5b. A recording magnetic field of the recording head 5 is induced by a write current passing in the coil 5b wound around the main pole 5a. The recording medium is magnetized by the recording magnetic field in the thickness direction of the medium. By use of the reproducing head 7 having a magneto-resistive (hereinafter, abbreviated to MR) effect device 7a, the magnetized information is reproduced from the perpendicular magnetic recording medium recorded as described above. On this occasion, a reproduced signal 8 from the head is formed into a rectangular-shaped waveform correspondingly to a recording magnetization pattern on the medium. This rectangular-shaped waveform has a dull leading edge in which the voltage is changed stepwise at transition positions in the direction of the recording magnetization as shown in FIG. 2. Bits $\{d_k\}$ are shown as a reproduced signal sequence.

The width of the leading or trailing edge in the reproduced waveform is determined on the basis of the structure or characteristic of the perpendicular magnetic recording head medium system 4, the recording/reproducing condition, or the like. This width, as well as the output voltage of the signal, is a factor to disturb high-density recording. Further, besides superposition of noise on the waveform due to various kinds of reasons, waveform distortion due to a frequency transformation characteristic of the head medium system or other electronic parts is caused on the waveform. In a reproduced signal processing circuit 9b, the reproduced signal 8 is amplified by a reproduction amplifier 10, the amplitude of the reproduced signal is adjusted to a predetermined level by an automatic gain control amplifier 10a, and then unnecessary high-frequency noise and an unnecessary high-frequency component are removed from the reproduced signal by a low-pass filter 11. Then, the reproduced signal is subjected to digital sampling by an analog-digital (A/D) converter 12 in synchronism with bit timing of the recording bit data $\{b_k\}$ so as to be converted into a discrete reproduced signal sequence $\{e_k\}$. According to the present invention, in order to detect data bits from the discrete reproduced signal sequence $\{e_k\}$ most efficiently with high reliability, the reproduced signal 8 is subjected to partial response equalization adapted therefor by a post-stage equalizer 13, and then the signal outputted from the equalizer 13 is converted, by a maximum-likelihood decoder 14, into a detected data bit sequence $\{g_k\}$ which is supposed to have a lowest data error rate. In the partial response equalization, intersymbol interference with given values is added to the output signal waveform in a finite bit length. Accordingly, increase of high-frequency noise caused by enhancement of a high-frequency component in the equalization is prevented as much as possible. In addition, the equalization is performed to prevent an influence of the signal distortion and the noise disturbance localized in a low frequency region in which the direct current (hereinafter, abbreviated to DC) component of the reproduced signal 8 is contained.

The maximum-likelihood decoder 14 performs data detection by use of Viterbi algorithm. The data bit sequence $\{g_k\}$ detected by the maximum-likelihood decoder 14 is subjected to an inverse process by a decoder 15 so that a reproduced bit data 16 $\{a_k'\}$ is outputted correspondingly to the original information bit data 1 $\{a_k\}$.

Figure 3:
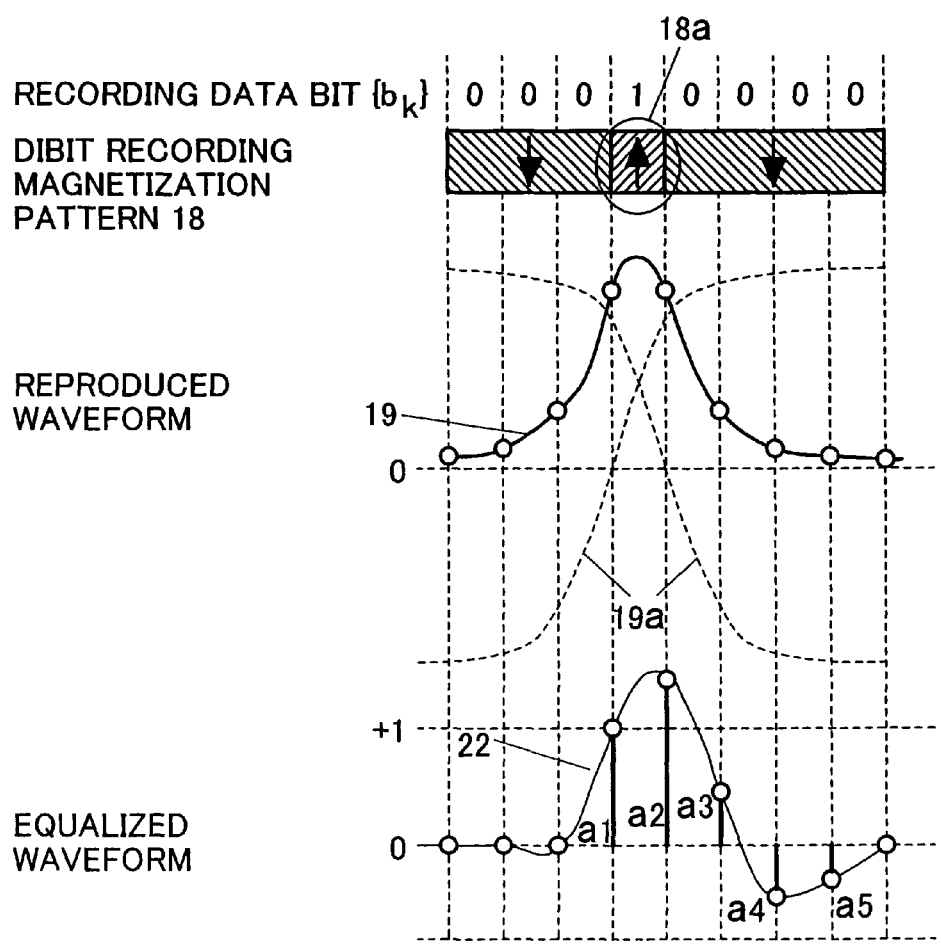
FIG. 3 is a diagram (time waveform) for explaining partial response equalization according to the present invention.

FIG. 3 is a diagram for explaining the details of the partial response equalization in the equalizer 13 according to the embodiment in FIG. 1. In FIG. 3, a reproduced waveform 19 is a waveform outputted from the reproducing head 7 when a dibit recording magnetization pattern 18 (a pair 18a of the closest two recording transitions at the shortest bit interval) on the recording medium 6 is reproduced.

Figure 4:
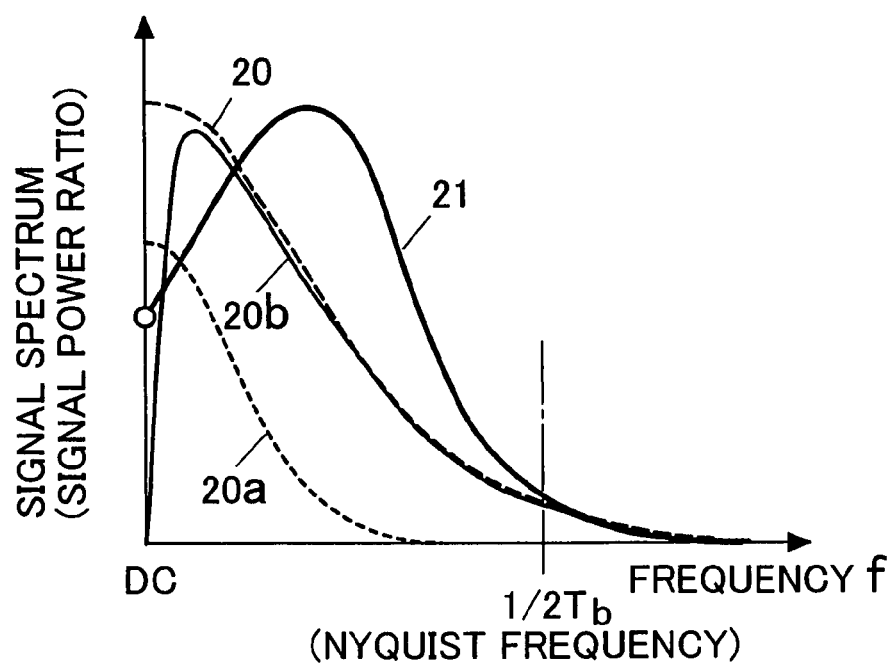
FIG. 4 is a diagram (frequency spectrum) for explaining the partial response equalization according to the present invention.

As described above, dull-leading-edge step response signal waveforms 19a overlie each other in synchronism with two magnetization transitions dependently on the frequency characteristic of the head medium system, so that an isolated pulse waveform is outputted. In a general perpendicular magnetic recording/reproducing system having the aforementioned head medium system, it is known that each of the step response signal waveforms 19a can be approximated by a tan h-type function. The dibit reproduced waveform 19 is approximated by the equation:

$$h(t) = Vpp \times \tan h((3.4154t)/(\pi \cdot K \cdot T_b))$$

$$- Vpp \times \tan h(3.4514(t-T_b)/(\pi \cdot K \cdot T_b)) \quad (1)$$

in which Vpp is the amplitude of the signal, K is a parameter that determines the width of the leading edge and $T_b$ is a bit time interval. Here, K is a value which is obtained by normalizing a time width with the bit time interval $T_b$, the time width being required for each of the step response signal waveforms to be changed between 25% and 75% of the maximum amplitude in the leading or tailing edge when the step response signal waveform is obtained by reproducing an isolated recording transition on the recording medium 6. This dibit reproduced waveform 19 can be regarded as an output waveform of impulse response to the head medium system, that is, signal response to an isolated bit "1" on the recording bit data $\{b_k\}$. This can be also regarded as detection response to the individual bit $b_k$ in the recording bit data. As shown in FIG. 4, a power spectrum 20 (a dotted line curve) of the dibit reproduced waveform 19 in the frequency region is formed so that signal energy to be used for bit detection is concentrated into a lower-frequency region around the DC component.

The reproduced signal 8 from the reproducing head 7 is, however, subjected to data reproduction via an electronic device such as the reproduction amplifier 10 and through signal transmission path characteristic. Hence, the data reproduction cannot get rid of the influence of waveform distortion caused by deterioration of the frequency characteristic. Particularly in the reproduction amplifier 10, a cut-off characteristic of the low-frequency components including the DC component cannot but be allowed in order to implement a wide band amplification circuit for performing high-density high-frequency recording/reproduction. As a result, the waveform distortion due to low-frequency component loss becomes remarkable in the output signal. That is, because the power spectrum 20 of the above-mentioned dibit reproduced waveform 19 passes through the reproduction amplifier, the power spectrum 20 is distorted and results in such a frequency characteristic that the frequency components around DC are lacked, as shown in a spectrum 20b. In order to perform compensation for the low-frequency waveform distortion in waveform processing, an excessively large complexity of compensation circuit is required. Moreover, this compensation has an ill effect of bringing excessive enhancement of noise components superposed on the reproduced waveform.

Further, the spectrum of medium noise sensed by the reproducing head 7 from the recording medium 6 has a frequency spectrum which is localized in a low frequency region around the DC component, as shown in the spectrum 20a in FIG. 4. In this manner, the power spectrum 20 of the dibit reproduced waveform 19 to be detected and the spectrum 20a of the medium noise have the same frequency spectrum having a peak in the vicinity of the DC component. Accordingly, it is very difficult to separate and detect the reproduced component from the low-frequency noise component.

According to the present invention, the dibit reproduced waveform 19 having the above-mentioned signal composition is subjected to waveform signal processing by the equalizer 13 so as to be shaped into an equalized waveform 22 having an equalized waveform power spectrum 21 shown in FIG. 4.

The reproduced waveform (a waveform obtained by viewing the power spectrum 20b of FIG. 4 in a time region) passed through the reproduction amplifier is subjected to low-frequency compensation so that the DC component of the waveform is suppressed to an optimal value. By performing the optimal low-frequency suppression in equalization, the medium noise component concentrated in low frequency as shown by the spectrum 20a is moderately suppressed or cut off, and the low-frequency component contained in the power spectrum 21 of the reproduced waveform actually observed is utilized for effective data detection, so that an optimal signal condition for data detection can be set up with a better signal-to-noise ratio.

In a high frequency region around the Nyquist frequency, the equalization is performed so that the spectrum intensity of the power spectrum 20 which is originally contained in the reproduced waveform 19 and the spectrum intensity of the equalized waveform are matched with each other (ideally, identical with each other) in the same manner as described in the background-art partial response equalization. By performing the equalization, enhancement of the high frequency equalized noise can be suppressed. Compared with the equalization in which DC component is completely cut off, in the equalization in which the low frequency components are suppressed moderately with some of them being allowed to remain, the enhancement of the high equalized frequency noise can be reduced more effectively, because the spectrum intensity of the power spectrum of the equalization waveform 21 can be more approximated around the Nyquist frequency to the spectrum intensity of the power spectrum 20 which is originally contained in the reproduced waveform 19. Further, in order to prevent a data decoding process from deteriorating in the post-stage, the noise component contained in the reproduced waveform is subjected to whitening. As described above, the reproduced signal is equalized by setting, as equalization target, the signal having such a frequency characteristic as represented by the spectrum 21 in FIG. 4. Thereby, data detection can be performed in a condition with less noise and less distortion.

In the background-art partial response equalization, intersymbol interference $(a_1, a_2, a_3, \ldots a_n)$ (the individual value $a_k$ of intersymbol interference is a value of a real number, k being an integer indicating a bit time, and $a_1$ and $a_n$ being values other than zero) is appropriately selected so that the intersymbol interference $(a_1, a_2, a_3, \ldots a_n)$ is conscientiously matched with the reproduced waveform 19, that is, the frequency composition of the power spectrum 20 (the frequency composition having the DC component as its peak). In this manner, the enhancement of the high-frequency equalized noise can be reduced. This partial response equalization is performed on the condition that all the values of intersymbol interference are the same in polarity. According to the present invention, in order to make an optimal compensation/suppression for the DC component of the reproduced waveform 19, intersymbol interference of the equalization target are set up so that the intersymbol interference with the same polarity (sign) starting from $a_1$ as the head and the intersymbol interference with the same polarity (sign) ending with $a_n$ as the tail are different in polarity from each other. In comparison with the dibit reproduced waveform 19 on this occasion, the shape of the equalized waveform 22 is observed as a dipulse waveform having asymmetrical amplitudes with opposite polarities so that the equalized waveform 22 is shaped like a waveform having undershoot with the opposite polarity (the portion of $a_4$ and $a_5$ in the equalized waveform 22 in FIG. 3) added to the tail part of the main signal component (the part of $a_1$, $a_2$ and $a_3$ in the equalized waveform 22 in FIG. 3), as shown in FIG. 3.

On the other hand, in the case where the DC component is completely cut off in the frequency characteristic of the equalization target, a constraint on $(a_1, a_2, a_3, \ldots a_n)$ is established as the equation (2).

$$a_1 + a_2 + a_3 + \ldots + a_n = 0 \qquad (2)$$

The constraint of the equation (2) is easily derived from the condition that the frequency spectrum (response) H(f) (f is a frequency) of the equalized waveform 22 is zero at f=0.

$$H(f) = a_1 \times \exp(-2\pi j f/T_b) + a_2 \times \exp(-2\pi j f \times 2/T_b) + a_3 \times \exp(-2\pi j f \times 3/T_b) + \ldots + a_n \times \exp(-2\pi j f \times n/T_b) \qquad (3)$$

Further, when $a_1 + a_2 + a_3 + \ldots + a_n \neq 0$, $|H(0)| = |a_1 + a_2 + a_3 + \ldots + a_n| \neq 0$. Accordingly, by adjusting the absolute value of $|a_1 + a_2 + a_3 + \ldots + a_n \neq 0|$, the DC component of the power spectrum 21 of the equalized waveform can be defined as a desired value.

The method for determining a frequency characteristic of a noise-whitening filter such that the noise energy outputted from the equalizer 13 is minimized with respect to a reproduced waveform 19 according to the above-mentioned constraint (4) can be performed by using some of a large number of classical theorems for filter design. Accordingly, by use of a large number of disclosed algorithms such as an adaptive algorithm of a linear-predictive filter or the like, the noise-whitening filter characteristic can be determined easily for the reproduced waveform from actual magnetic recording/reproducing system.

A target value of the partial response equalized waveform (intersymbol interference) which can intentionally suppress the DC component can be generally defined on the basis of the following transmission polynomial (target response polynomial) F(D).

$$F(D) = (p_1 + p_2 D + p_3 D^2 + \ldots + p_n D^{n-1})(1 - \alpha D) \qquad (4)$$
$$= p_1 + (p_2 - \alpha p_1)D + (p_3 - \alpha p_2)D^2 + \ldots +$$
$$(p_k - \alpha p_{k-1})D^{k-1} + \ldots + (p_n - \alpha p_{n-1})D^{n-1} - \alpha p_n D^n$$

in which $D^n$ is an n bit-delay operator and $\alpha$ is a real number in a range of $0 \leq \alpha \leq 1$. Here, each of $p_1, p_2, p_3, \ldots, p_k, \ldots, p_n$ is a real number indicating a ratio of adding intersymbol interference. The transmission polynomial (target response polynomial) F(D) is expressed by the above-mentioned partial response intersymbol interference as follows.

$$(p_1, p_2 - \alpha p_1, \ldots, p_k - \alpha p_{k-1}, \ldots, p_n - \alpha p_{n-1}, -\alpha p_n)$$

That is, $$(a_1, a_2, \ldots a_n) = (p_1, p_2 - \alpha p_1, \ldots, p_k - \alpha p_{k-1}, \ldots, p_{n-1} - \alpha p_{n-2}, -\alpha p_{n-1})$$

The first term $(p_1 + p_2 D + p_3 D^2 + \ldots + p_n D^{n-1})$ of the transmission polynomial (target response polynomial) F(D) is intersymbol interference for matching the power spectrum 21 of the equalized waveform with the power spectrum 20 of the reproduced waveform 19, and the first term $(p_1 + p_2 D + p_3 D^2 + \ldots + p_n D^{n-1})$ can be determined on the basis of the design of the noise-whitening matched filter. Generally, each ratio of adding intersymbol interference which is matched with a signal having a frequency composition with the DC component such as the power spectrum 20 as the peak is the same in sign.

The second term $(1 - \alpha D)$ in the F(D) means operation of adding intersymbol interference for the purpose of adding a low-frequency suppression characteristic which is a feature of the present invention. At the same time, it also means a process to subtract signal values, each of which is delayed by 1 bit time and increased to $\alpha$ times, with respect to signal values of the reproduced signal in time series, respectively. This parameter $\alpha$ is designed to suppress the low frequency region of the target equalized waveform to thereby adjust the DC component. Particularly, when $\alpha$ is set to 0, that means that the DC component is completely passed through. On the other hand, when $\alpha$ is set to 1, that means that the DC component is completely cut off. After the intersymbol interference in the first term of the F(D) are determined for the reproduced waveform, the parameter $\alpha$ is adjusted appropriately. Alternatively, $\alpha$ may be determined first, and then the intersymbol interference in the first term of the F(D) is determined on the basis of the design criterion of the noise-whitening matched filter under the constraint of the equation (4).

FIGS. 5 through 7 are tables showing the respective amplitude ratios of the optimal intersymbol interference, which are to be selected according to the present invention, correspondingly to different values of the parameter $\alpha$ for the reproduced waveform 19 set in the equation (1) having the parameter K different in value.

Figure 8:
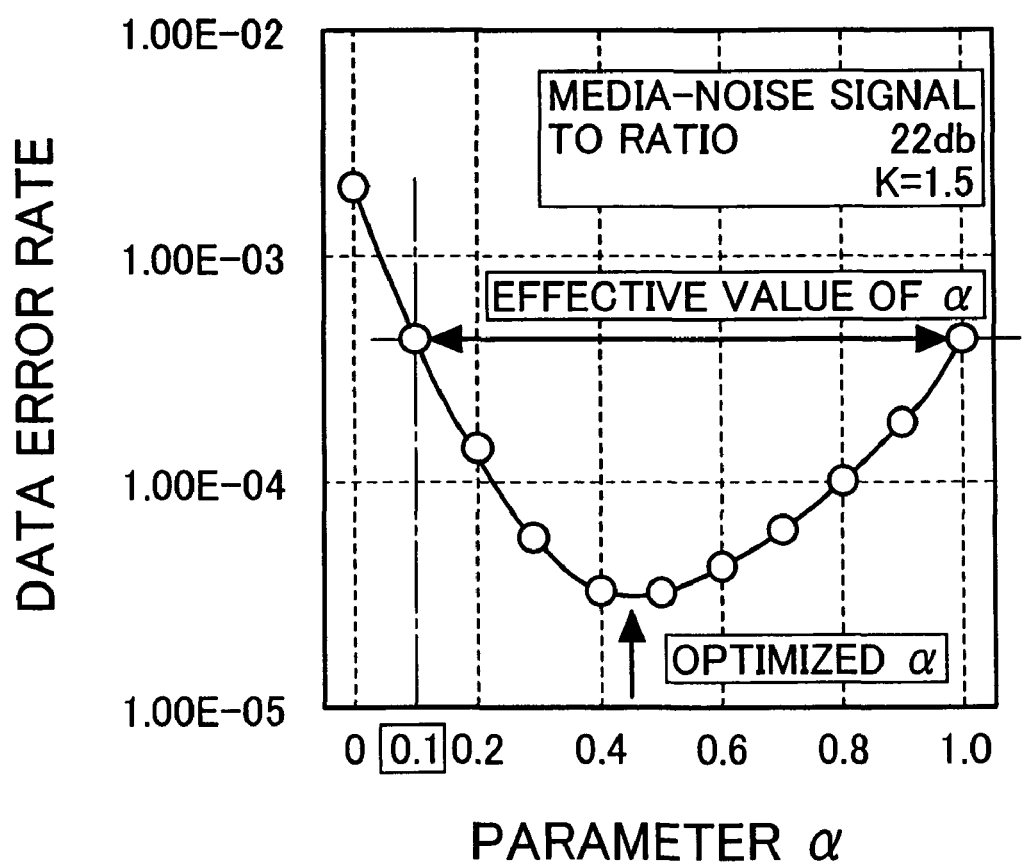
FIG. 8 is a diagram showing the relation between a low-frequency suppression parameter α and a data error rate according to the present invention.

Further, FIG. 8 is a diagram showing the relation between the selected low-frequency suppression parameter $\alpha$ and the data error rate (reliability of the data detection) with respect to the reproduced signal with parameter K of 1.5. As apparent from FIG. 8, when $\alpha$ is set up within the range of from 0.1 to 1 ($0.1 \leq \alpha \leq 1$), the equalization system can bring about a lower data error rate, compared with the case of $\alpha=0$, that is, compared with the equalization system of completely cutting off the DC component. For the real reproduced signal in the perpendicular magnetic recording/reproducing system, an optimal value of $\alpha$ is selected in accordance with the characteristic of the reproduced signal and the medium noise.

As described above, in the partial response equalization system according to the present invention, the equalization target, that is, the intersymbol interference is determined on the basis of the first condition that to what extent, the DC component in the reproduced signal is to be compensated, and the second condition that the noise component is subjected to whitening and the noise intensity is reduced as much as possible.

Figure 9:
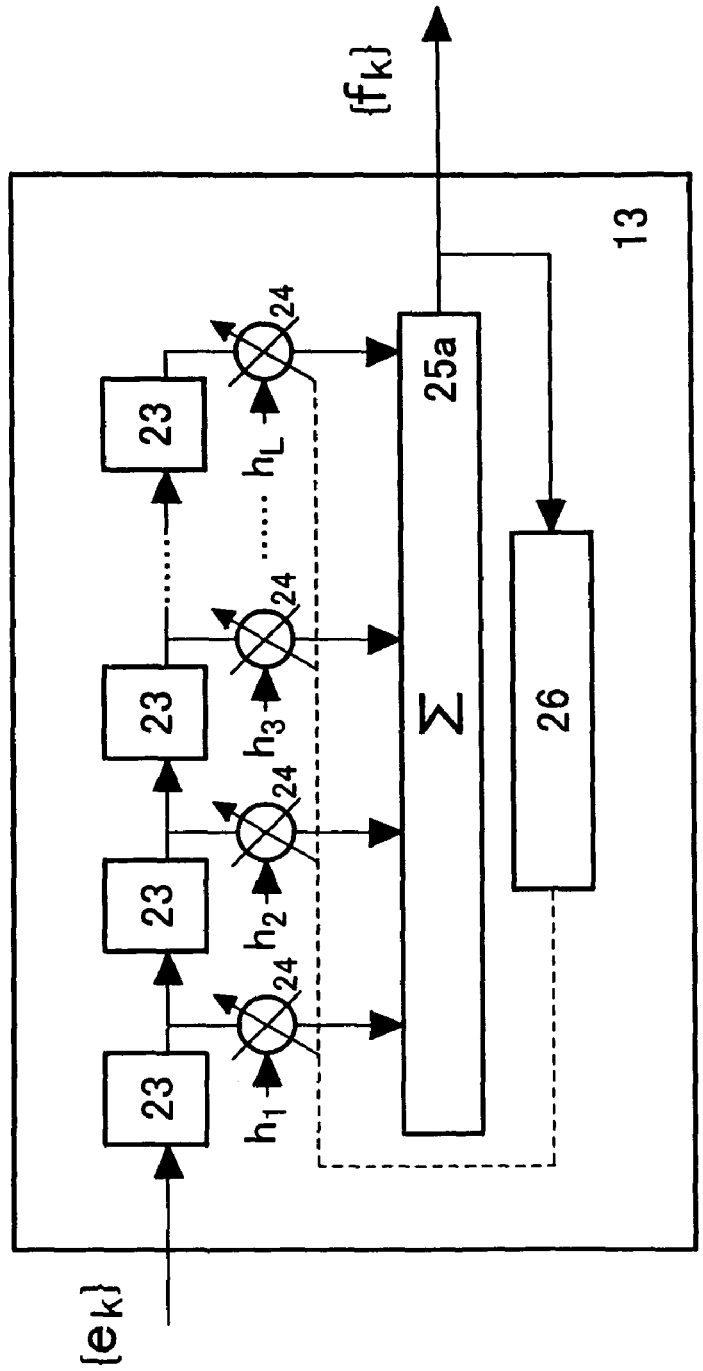
FIG. 9 is a diagram showing the configuration of a partial response equalizer by a transversal filter.

By use of a known filter design theorem, it is very easy to determine the circuit parameter of the equalizer 13 correspondingly to the thus-determined optimal intersymbol interference ($a_1, a_2, a_3, \ldots a_n$) on the basis of the relation with the inputted reproduced waveform 19. In most cases, the equalizer 13 is constituted by a shift register and a transversal filter. The shift register has series-connected storage delay devices 23 for storing 1-bit signal values respectively, and the transversal filter has multipliers 24, an adder 25a, etc. for multiplying storage contents by predetermined tap coefficients ($h_1, h_2, h_3, \ldots, h_L$; L is a tap length) and performing sum-product operations respectively, as shown in FIG. 9. The equalizer 13 is further constituted by an adaptation circuit 26 which observes a signal outputted from the equalizer and calculates optimal tap coefficients while the error between the observed signal and the target signal determined on the basis of the intersymbol interference ($a_1, a_2, a_3, \ldots a_n$) is valued.

Figure 10:
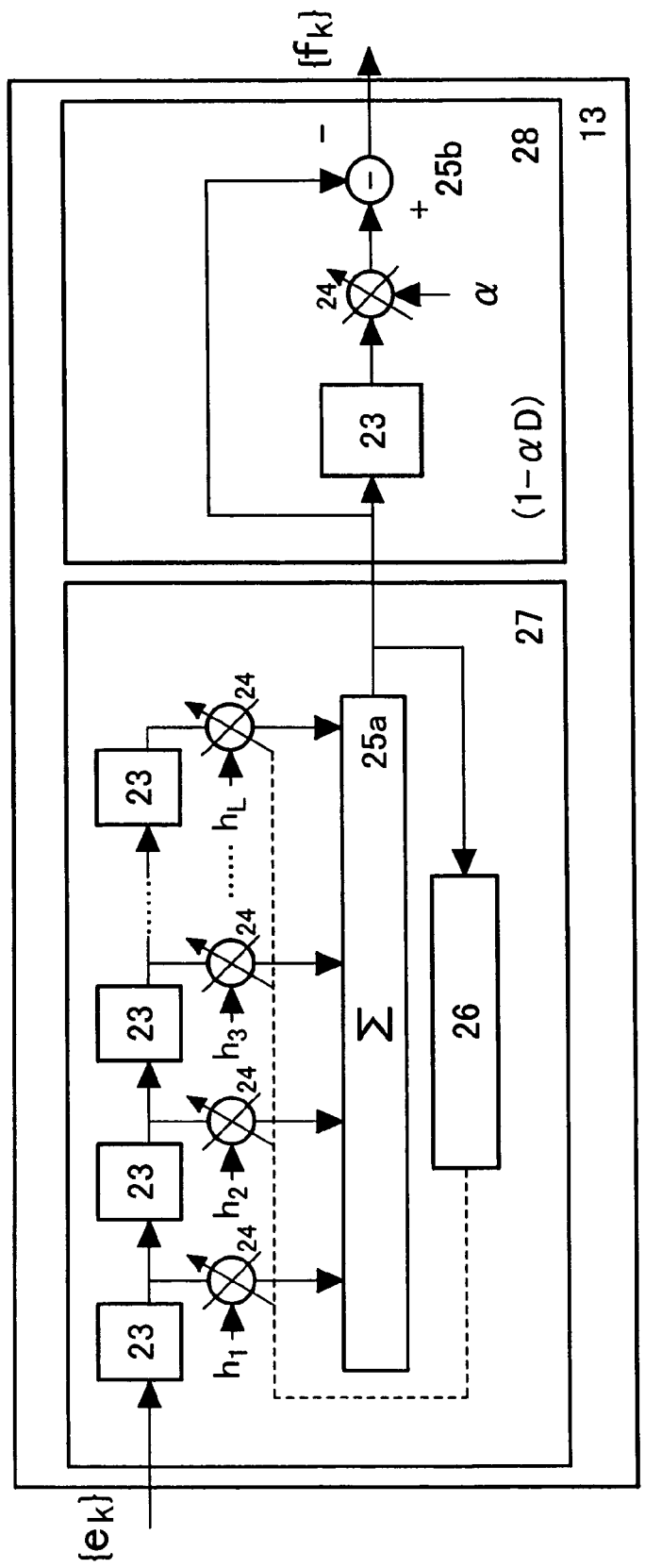
FIG. 10 is a diagram showing an embodiment of the partial response equalizer according to the present invention.

FIG. 10 is a diagram showing another embodiment of a general equalizer for effectively realizing the partial response equalization to the real reproduced signal according to the present invention. In the real recording/reproducing system, the equalizer 13 is constituted by two delay-add operation circuit portions so as to select and use a more appropriate α correspondingly to various characteristics of the perpendicular recording head medium system. In accordance with the above-mentioned partial response transmission characteristic, transmission polynomial (target response polynomial) F(D) is expressed as follows.

$$F(D) = p_1 + p_2 D + p_3 D^2 + \ldots + p_n D^{n-1})(1-\alpha D) = \\ p_1 + (p_2 - \alpha p_1) D + (p_3 - \alpha p_2) D^2 + \ldots + \\ (p_k - \alpha p_{k-1}) D^{k-1} + \ldots + (p_2 - \alpha p_{n-1}) D^{n-1} - \alpha p_n D^n \quad (4)$$

in which $D^n$ is an n bit-delay operator and α is a real number in a range of $0 \leq \alpha \leq 1$.

The filter 27 in the pre-stage is a noise-whitening matched filter. With the same configuration as that in the transversal filter in FIG. 9, the pre-stage filter 27 performs partial response equalization for adding intersymbol interference represented by the first term ($p_1 + p_2 D + p_3 D^2 + \ldots + p_n^{n-1}$). In order to achieve the second term ($1-\alpha D$) by use of the variable parameter α, the low-frequency suppression filter 28 in the post-stage is constituted by a storage delay device 23, a multiplier 24 and a subtractor 25b. The storage delay device 23 stores a 1-bit signal. The multiplier 24 multiplies the output from the storage delay device 23 by a suppression parameter α. Alternatively, the process of ($1-\alpha D$) performed by the post-stage low-frequency suppression filter 28 may be provided in the pre-stage of the noise-whitening matched filter 27. In addition, with reference to the output signal values from the noise-whitening matched filter 27 or the equalizer 13, an optimal filter tap coefficient $h_f$ of the transversal filter corresponding to the reproduced signal is calculated by an adaptation circuit 26. This calculation can be also easily performed by any known technique.

Figure 11:
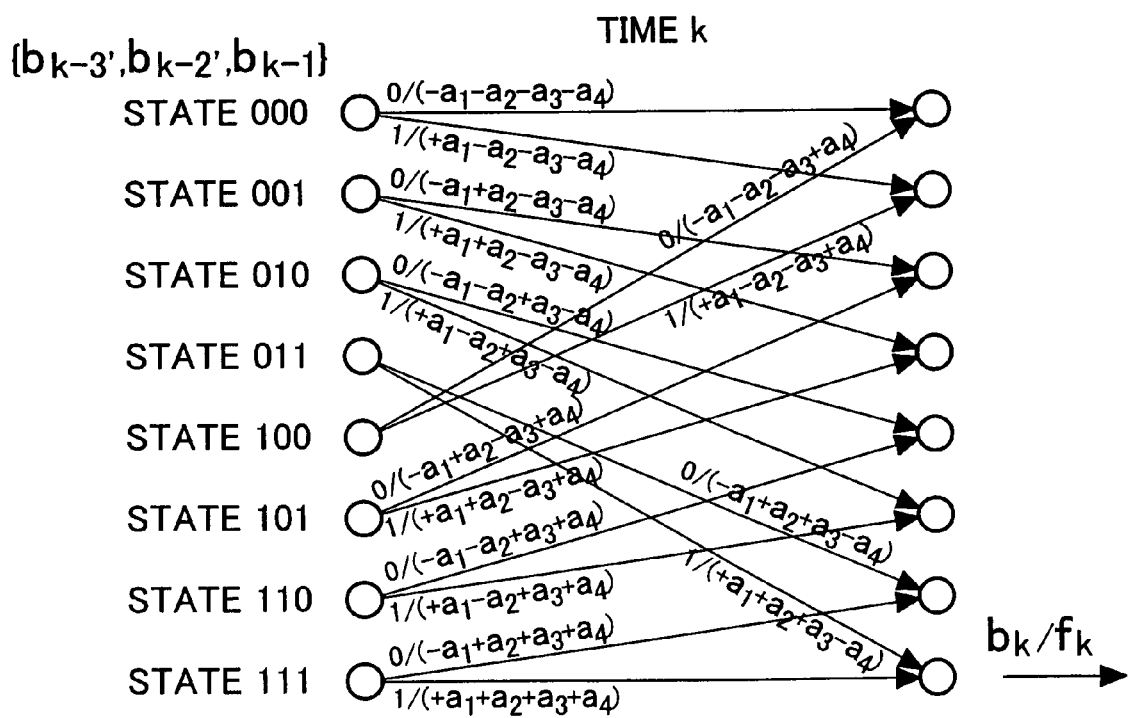
FIG. 11 is a view showing an example (n=4) of a state transition trellis diagram of Viterbi decode according to the present invention.

The signal outputted from the equalizer 13 in the embodiment is decoded to a data stream by a maximum-likelihood decoder 14 by use of known Viterbi algorithm or the like. FIG. 11 is a view showing an example (n=4) of a state transition trellis diagram of the Viterbi decode. Each arrow shows a recording bit data 3 {$b_k$} and one of the output signal values {$f_k$} from the equalizer 13 correspondingly to the recording bit data 3 {$b_k$} at a bit time k. In all the state transitions shown by time-transitions in this trellis diagram, a bit sequence shown by the transition with the most probability is selected as detected data and the signal is then reproduced.

Embodiment 2

Figure 12:
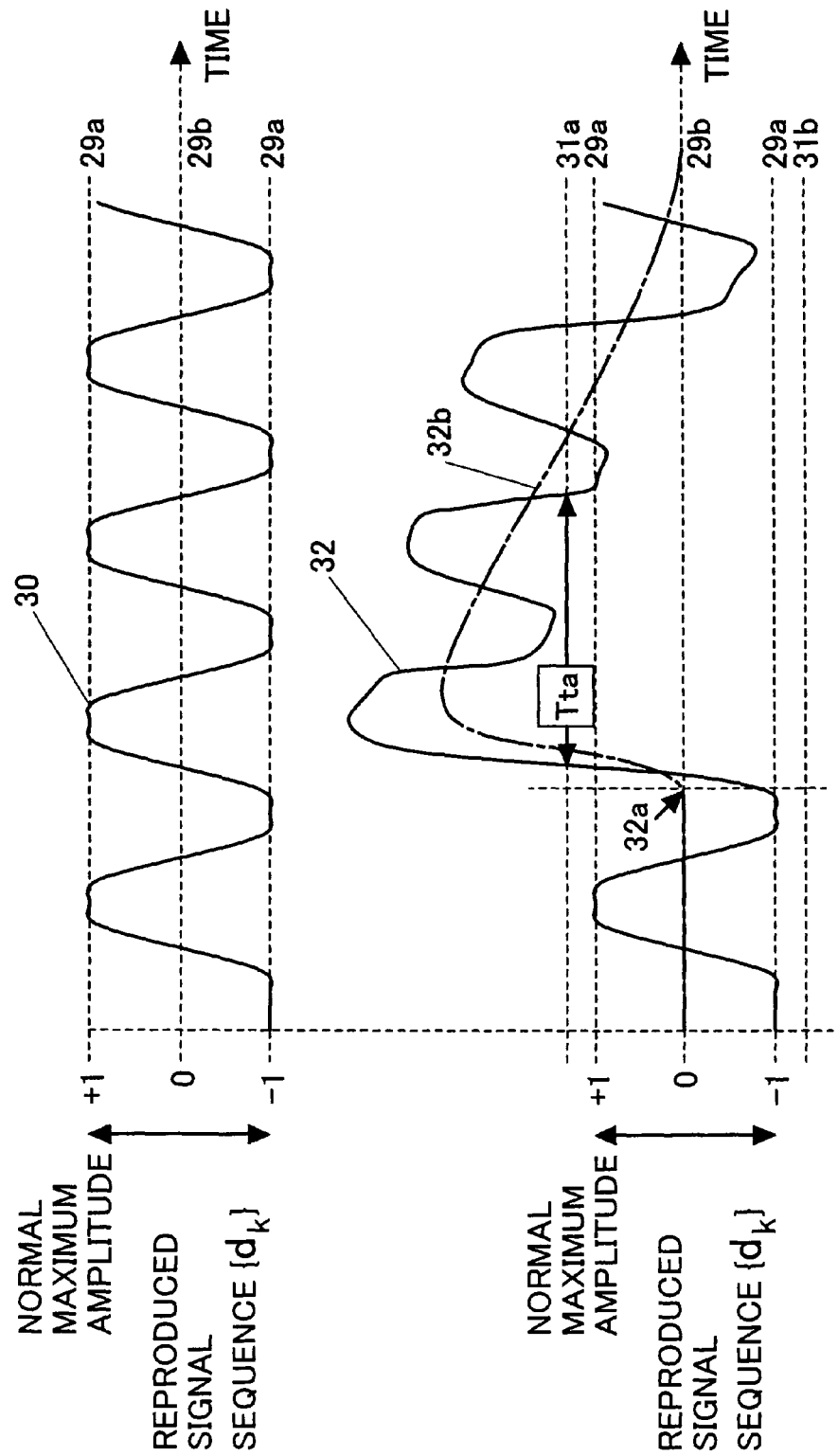
FIG. 12 is a diagram showing thermal asperity phenomena.

In the equalizer 13 according to the present invention, the low-frequency component of the reproduced signal containing the DC component can be adjusted flexibly by changing the suppression parameter α. This flexible adjustment can help to reduce an influence of the DC component off-set or the low-frequency variation/distortion which often occurs in the real reproduced signal. Particularly, in the high-density recording/reproducing system, due to variation in characteristic of the reproducing head 7, and the shortened distance between the reproducing head 7 and the recording medium 6, there occur remarkably thermal asperity (hereinafter, abbreviated to TA) phenomena because MR characteristic is changed largely due to the temperature rising caused by the contact between the MR effect device 7a and the recording medium 6. Consequently, a DC offset variation large enough to exceed a normal maximum amplitude occurs in the reproduced signal. FIG. 12 is a typical diagram for explaining the TA phenomena.

Generally, a normal waveform 30 is controlled to be accommodated in a signal level between two normal maximum signal levels 29a by the automatic gain control amplifier 10a, and has a normal offset level 29b stabilized by predetermined offset adjustment. When the TA phenomena occur in the normal waveform 30, typically, a waveform phenomenon such as a TA waveform 32 is observed, an abrupt offset variation 32b exceeding one of the normal maximum signal levels 29a occurs since a TA-occurring time 32a. This offset variation continues for quite a long time until the TA phenomena are eased. In most cases, the offset variation 32b largely exceeds the normal maximum signal level 29a, and the exceeding state continues typically for a time in a range of from tens bits to hundreds bits. As apparent from FIG. 12, the signal offset variation 32h due to the TA phenomena is superposed on the normal reproduced waveform 30 for a long time, so that it is difficult to perform data detection by the partial response equalization and the maximum-likelihood decoding in the system where the DC component remains. The influence of the offset variation 32b can be eliminated by intensifying the DC-cut-off characteristic of the equalizer.

Figure 13:
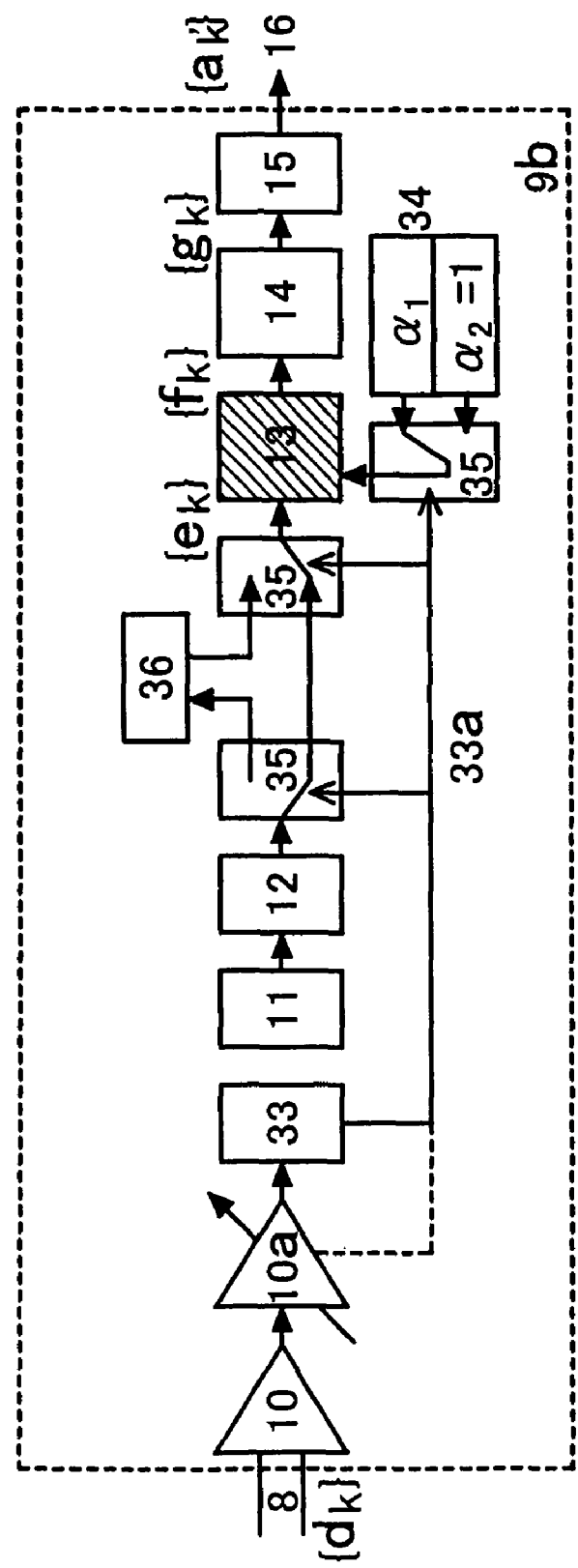
FIG. 13 is a diagram showing a second embodiment of the reproduced signal processing circuit according to the present invention.

FIG. 13 is a diagram showing an embodiment of a reproducing signal processing circuit 9b for performing such elimination. In the post-stage of the reproduction amplifier 10, there is provided a TA detection circuit 33 for detecting occurrence of such a TA waveform 32 shown in FIG. 12. There are various methods to detect the TA waveform. There are various methods to detect an abrupt variation in a detected input reproduced signal level in the automatic gain control amplifier 10a, or to detect the variation as an irregular signal when the level of the reproduced waveform 32 exceeds corresponding one of predetermined TA-detection thresholds 31a and 31b continuously for a time not shorter than a predetermined time $T_{ta}$. In the embodiment, generally, data detection is performed by use of the parameter α for giving an optimal signal condition to the normal reproduced waveform 30, that is, by use of the partial response equalization for moderately compensating a low frequency region, and when the TA waveform 32 is detected, the low-frequency suppression parameter α is selected to be 1 in the equalizer 13 so that DC cut-off is intensified to thereby eliminate the influence of the TA waveform 32. The suppression parameter α is stored as a plurality of values ($\alpha_1, \alpha_2, \ldots$) in a register circuit 34 or the like. One of the values ($\alpha_1, \alpha_2, \ldots$) is selected by a selection circuit 35 in accordance with an alarm signal (control signal) 33a for notifying an irregular signal such as the TA waveform or the like. The selection circuit 35 supplies the selected value to the equalizer 13.

In such a manner, a plurality of values of the parameter α are changed over to operate the equalizer 13 between the case where an irregular signal such as the TA waveform 28, the offset variation or the like is detected, and the normal case where no irregular signal is detected. In other words, partial response equalization processes having different DC component passing characteristics are selectively used so that reliability of the data detection can be made higher upon a reproduced signal processing condition which is more suitable for the condition of the reproduced signal. Alternatively, in stead of the parameter α, sets of equalizer tap coefficients ($h_1$, $h_2$, $h_3$, . . . , $h_L$) for the equalizer 13 to realize the equalizer characteristics for the partial response equalization having DC component passing characteristics, or other equalizer parameter sets defining other characteristics are prepared so that setting of the equalizer 13 is made by selecting one from the tap coefficients ($h_1$, $h_2$, $h_3$, . . . , $h_L$) and other equalizer parameter sets. Incidentally, a signal delay circuit 36 is provided to perform a delay in the irregular signal portion for complementing the delay due to detection processing of the irregular signal, or the delay attended with process of switching over from one equalization parameter to another parameter. Because the signal delay circuit 36 per se does not have any relation with the gist of the present invention, description about the circuit 36 is omitted here.

Embodiment 3

As a specific configuration for achieving a circuit which is used selectively for different equalization characteristics in accordance with the reproduced signal, there may be used a configuration in which one reproducing system signal processing circuit is formed to make equalizer parameters variable for different equalization characteristics, as shown in FIG. 13. Alternatively, there may be used another configuration, according to an embodiment shown in FIG. 14, in which a plurality of systems each constituted by equalizers 13 and a maximum-likelihood decoder 16 as a pair are prepared. The equalizers 13 have different DC low-frequency component passing characteristics from one another. On the basis of an irregular signal detected by the TA detection circuit 29 or the like, a data detection result with higher reliability can be obtained by selectively supplying the reproduced signal to one of the plurality of systems. Alternatively, when the irregular signal is detected, a data detection result sent from more appropriate one of the plurality of reproducing systems which employs an intensive DC cut-off characteristics may be selected through a selector 35.

Embodiment 4

In most cases, for a partial response waveform equalization circuit, an automatic gain controller 39a for controlling an adjustment gain of an automatic gain controller 10a which is disposed in the pre-stage, and a timing extraction circuit 39b for controlling a sampling timing of an reproduced signal in an analog-digital converter 12 are provided. On this occasion, control signal information 38 for controlling is fed back and referred to from the output of an equalizer 13 or from any portion in the post-stage of the equalizer 13. Similarly, control information of an adaptation circuit 26 for adjusting tap information of the equalizer 13 is extracted from any portion in the post-stage. In this case, when DC offset or low frequency waveform variation due to the TA variation or the like gives adverse influences on the control systems, and the influence stays on the feedback control systems continuously for a long time, a normal operation of the reproduced signal processing system is disturbed.

Figure 14:
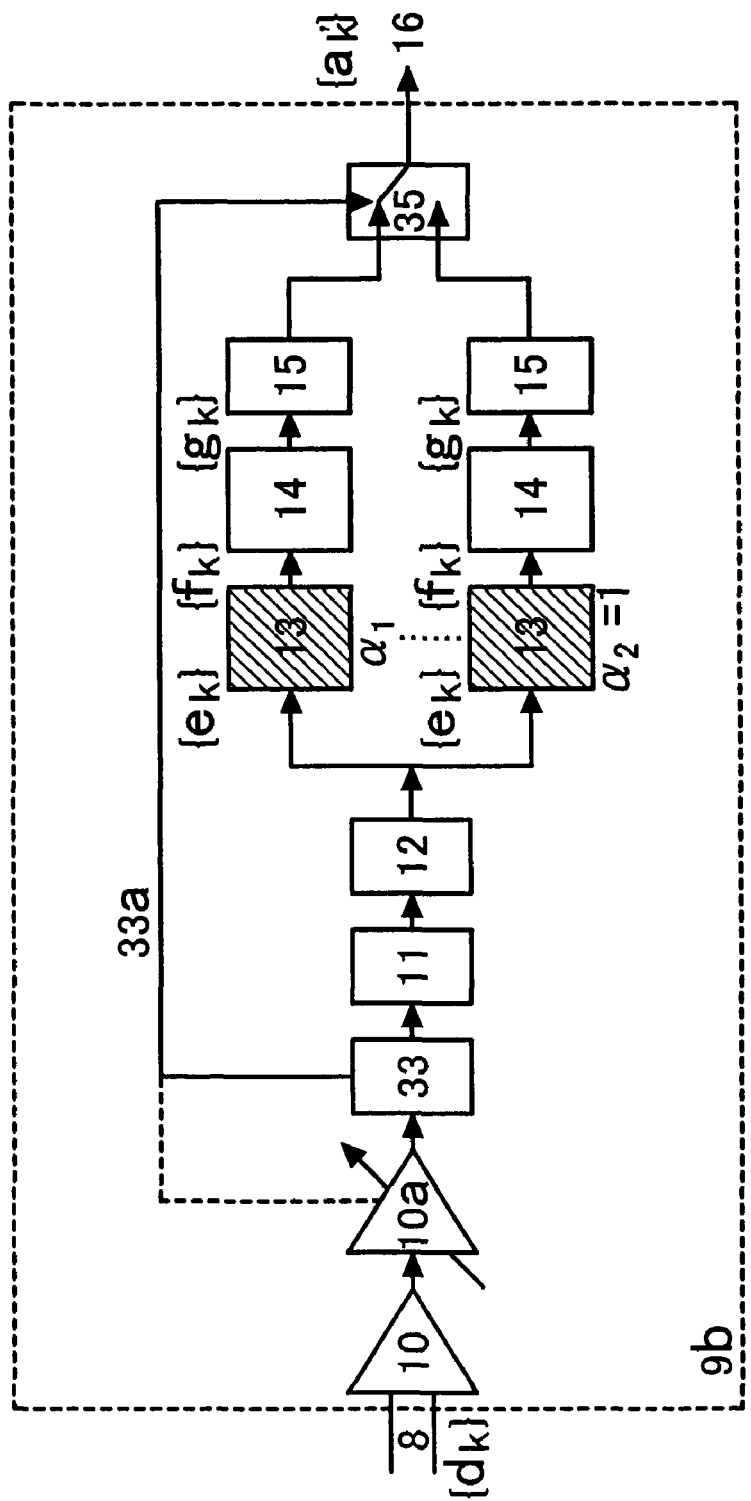
FIG. 14 is a diagram showing a third embodiment of the reproduced signal processing circuit according to the present invention.
Figure 15:
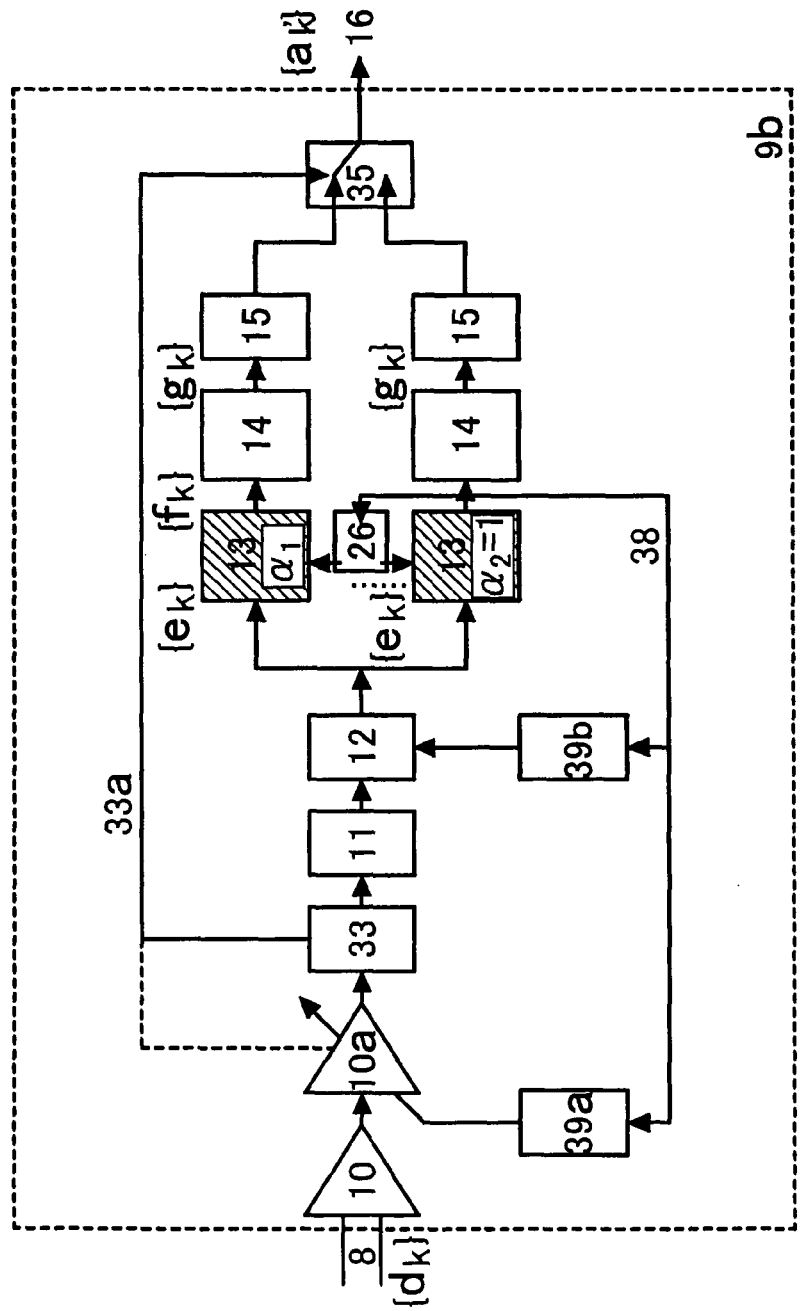
FIG. 15 is a diagram showing a fourth embodiment of the reproduced signal processing circuit according to the present invention.

According to the embodiment, a reference signal is obtained from any portion in the post-stage of the equalizer 13 in a system having a cut-off characteristic of the DC component, or in a reproducing system having the parameter α=1, among those partial response signal processing systems prepared in the embodiment shown in FIG. 14. The circuitry according to the embodiment is shown in FIG. 15. Alternatively, if the purpose is only to obtain the above-mentioned control information signal 38, only the equalizer 13 in the system having the cut-off characteristic of the DC component or in the reproducing system having the parameter α=1 may be provided while the signal processing system in the post-stage of the equalizer 13 such as a maximum-likelihood decoder 14 or the like is omitted. Accordingly, the input of the DC/low-frequency variation giving a bad influence to the operation of the control systems is eliminated, so that the magnetic recording/reproducing apparatus according to the present invention can have an optimal DC cut-off characteristic by use of another system, can realize high reliability data detection with an optimal parameter α, and can sustain high reproduction reliability.

Embodiment 5

Because an magnetic recording/reproducing apparatus according to the present invention performs the partial response equalization allowing passage of a low frequency component around DC and the data detection in maximum-likelihood decording, the quantity of medium noise localized in a low frequency region, as shown in FIG. 4, becomes an important factor to determine the reliability of the data detection. According to the present invention, although the influence of the noise is reduced optimally from the viewpoint of efficient utilization of the low frequency component of the reproduced signal, not to say, reduction of the absolute quantity of the medium noise is advantageous in improvement of data detection of the magnetic recording/reproducing apparatus. Accordingly, as shown in FIG. 16, in order to suppress localization of the influence of the low-frequency medium noise, the recording data is converted into bits in a coder 2, so that a maximum number of consecutive recording transitions which are recorded in a shortest bit length on the medium is limited to a value not larger than a predetermined value m. Thereafter, the converted bit information is recorded on the recording medium 6.

For example, if a limitation m=3 is provided, bit information can be recorded on the recording medium 6 with redundancy selected to be not larger than 6% to 9% of the recording information. If a limitation m=4 is provided, the bit information recording can be performed with redundancy selected to be not larger than 3% to 5% of the recorded information. This arrangement reduces the medium noise without reducing the efficiency of the recording reproduction to thereby improve the reliability of the data detection. The influence of the medium noise can be reduced by using the above-mentioned bit conversion in combination with the partial response equalization according to the present invention.

In the magnetic recording/reproducing apparatus according to the above embodiments, the signal processing circuit system, the recorded signal processing circuit 9a and the reproduced signal processing circuit 9b can be produced by the existing circuit technique easily, as semiconductor integrated circuits which are high in operation speed, high in integration density and small in size. If such semiconductor integrated circuits are mounted on the magnetic recording/reproducing apparatus having a perpendicular magnetic recording head medium system 4, the reliability of data detection can be improved and the information can be recorded and reproduced at a higher density.

According to the present invention, there can be provided a magnetic recording/reproducing apparatus in which, with respect to an reproduced signal recorded in a perpendicular magnetic recording system having a double-layer medium and a highly sensitive MR reproducing head, the reliability of data detection in maximum-likelihood decoding is improved, a lower SN ratio of the reproducing signal can be allowed, and information storage with higher density can be realized, in comparison with the case where the background art is used; and it is possible to provide a magnetically recorded/reproduced signal processing circuit using the magnetic recording/reproducing system.

According to the present invention, there can be provided a recorded/reproduced signal processing circuit by which an influence of noise made from a recording medium can be reduced more effectively. In addition, on the assumption that a reproduced waveform is influenced by low frequency deterioration/distortion due to transformation characteristic of a signal processing transmission system in the pre-stage such as a reproducing amplifier circuit or the like, the recorded/reproduced signal processing circuit can perform equalization to suppress the low frequency deterioration/distortion. Accordingly, the recorded/reproduced signal processing circuit can reduce the influence of the deterioration/distortion without adding any special compensation circuit or the like while the characteristic deterioration of the pre-stage signal processing transmission system is allowed. Further, according to the present invention, there can be provided a means comprising a processing system which eliminates DC reproduction detection from the reproducing signal, and by selectively using the processing system, there can be provided a means in which maximum-likelihood decoding data detection is not influenced by the DC offset or variation of the reproduced waveform due to the contact (thermal asperity) between the recording medium and a MR reproducing device or the variation of the head characteristic, so that the reliability of the recording/reproducing system can be improved.

What is claimed is:

1. A magnetic recording/reproducing apparatus, comprising a perpendicular magnetic recording medium and a reproducing head, wherein a reproduced signal outputted from said reproducing head is processed through a partial response equalization circuit having a function of a noise-whitening matched filter, and having a frequency characteristic so that a low-frequency component of said reproduced signal including a direct current component is partially suppressed but not completely cut off through said partial response equalization circuit having said noise-whitening matched filter function, wherein said reproduced signal outputted from said partial response equalization circuit having said noise-whitening matched filter function is supplied to a maximum-likelihood decoder so as to be data-reproduced, wherein reproduced waveforms responding to a pair of the two closest recording transitions recorded on said recording medium at a shortest bit length interval are outputted as a waveform having intersymbol interference with intersymbol interference values $A_1$, $A_2$, $A_3$, ..., $A_k$, ..., $A_N$ wherein k is an integer indicating bit time, $A_1$, $A_2$, $A_3$, ..., $A_k$, ..., $A_N$ are real or integer numbers, and $A_1$ and $A_N$ are non-zero numbers with opposite signs or polarities: $A_1+A_2+A_3$ ... + $A_k$ ... + $A_N \neq 0$ and $N>2$ at each bit time through said partial response equalization circuit having said noise-whitening matched filter function, or as a dipulse waveform having asymmetrical amplitudes with opposite polarities through said partial response equalization circuit having said noise-whitening matched filter function, and wherein said outputted waveforms are supplied to said maximum-likelihood decoder so as to be data-reproduced.

2. A magnetic recording/reproducing apparatus according to claim 1, wherein said reproduced waveform responding to a pair of the closest two recording transitions recorded on said recording medium at a shortest bit length interval are outputted as a waveform having intersymbol interference with amplitude ratios $P_1$, $P_2$-α $P_1$, ..., $P_k$-α$P_{k-1}$, ..., $P_n$-α$P_{N-1}$, -α$P_N$ wherein a is a value of real number in a range of $0<\alpha<1$, k is an integer indicating bit time, $P_1$, $P_2$, ..., $P_k$, ..., and $P_N$ are real or integer numbers with the same sign or polarity, and $P_1$ and $P_N$ are non-zero numbers and $N\geq 2$ at each bit time through said noise-whitening matched filter, and wherein said outputted waveforms are supplied to said maximum-likelihood decoder so as to be data-reproduced.

3. A magnetic recording/reproducing apparatus according to claim 2, wherein the noise-whitening matched filter includes a plurality of partial response equalization units having different values of parameter a, and wherein a reproduced signal from said reproducing head is supplied to said plurality of partial response equalization units so as to be waveform-equalized in said partial response equalization units.

4. A magnetic recording/reproducing apparatus according to claim 3, wherein at least one of said different values of parameter a satisfies a condition of $\alpha=1$.

5. A magnetic recording/reproducing apparatus according to claim 3, wherein at least one of said different values of parameter a satisfies a condition of=0.

6. A magnetic recording/reproducing apparatus according to claim 2, wherein one of different values of parameter a is selected and set in said noise-whitening matched filter, and wherein said reproduced signal from said reproducing head is supplied to said noise-whitening matched filter so as to be waveform-equalized.

7. A magnetic recording/reproducing apparatus according to claim 6, wherein at least one of said different values of said parameter a satisfies a condition of $\alpha=1$.

8. A magnetic recording/reproducing apparatus according to claim 6, wherein at least one of said different values of parameter a satisfies a condition of $\alpha=0$.

9. A magnetic recording/reproducing apparatus according to claim 1, wherein the noise-whitening matched filter includes a plurality of partial response equalization units outputting different waveforms with different intersymbol interferences, and wherein a reproduced signal from said reproducing head is supplied to said plurality of partial response equalization units so as to be waveform-equalized in said partial response equalization units.

10. A magnetic recording/reproducing apparatus according to claim 9, wherein at least one of said different waveforms having different intersymbol interference is defined with $A_1+A_2+A_3 ... +A_k ... +A_N=0$.

11. A magnetic recording/reproducing apparatus according to claim 9, wherein at least one of said different waveforms having different intersymbol interference from each other, and the intersymbol interference values of each intersymbol interference $A_1, A_2, A_3, ..., A_k, ..., A_N$ is defined with all of $A_1, A_2, A_3, ..., A_k, ..., A_N$ having the same sign.

12. A magnetic recording/reproducing apparatus according to claim 1, wherein one of different waveforms having different intersymbol interference from each other is selected and set in said noise-whitening matched filter, and
wherein said reproduced signal from said reproducing head is supplied to said noise-whitening matched filters so as to be waveform-equalized.

13. A magnetic recording/reproducing apparatus according to claim 12, wherein at least one of said different waveforms with different intersymbol interferences is defined with $A_1+A_2+A_3 \ldots +A_k \ldots +A_N=0$.

14. A magnetic recording/reproducing apparatus according to claim 12, wherein at least one of said different waveforms having different intersymbol interference from each other, and the intersymbol interference values of each intersymbol interference $A_1, A_2, A_3, \ldots, A_k, \ldots, A_N$ is defined with all of $A_1, A_2, A_3, \ldots, A_k, \ldots, A_N$ having the same sign.

15. A magnetic recording/reproducing apparatus, comprising a perpendicular magnetic recording medium and a reproducing head,
wherein a reproduced signal outputted from said reproducing head is processed through a partial response equalization circuit having a function of a noise-whitening matched filter,
wherein a waveform of an impulse response at an output of said partial response equalization circuit having said noise-whitening matched filter function in response to an input impulse signal from said reproducing head has a frequency characteristic such that a low-frequency component of said waveform of said impulse response is partially suppressed but not completely cut off, and
wherein said reproduced signal outputted from said partial response equalization circuit having said noise-whitening matched filter function is supplied to a maximum-likelihood decoder so as to be data-reproduced.

16. A magnetic recording/reproducing apparatus according to claim 15, wherein said waveform of said impulse response at said output of the noise-whitening matched filter is defined by a waveform having intersymbol interference with intersymbol interference values $A_1, A_2, A_3, \ldots A_k, \ldots, A_N$ wherein k is an integer indicating bit time, $A_1, A_2, A_3, \ldots, A_k, \ldots, A_N$ are a real or integer numbers, and $A_1$ and $A_N$ are non-zero numbers with opposite signs or polarities:
$A_1+A_2+A_3 \ldots +A_k \ldots +A_N \neq 0$ and $N \geq 2$ at each bit time, or
by a dipulse waveform having asymmetrical amplitudes with opposite polarities or having undershoot, and
wherein said reproduced signal outputted from said noise-whitening matched filter is supplied to a maximum-likelihood decoder so as to be data-reproduced.

17. A magnetic recording/reproducing apparatus according to claim 16, wherein said impulse response waveform at the output of said noise-whitening matched filter is defined by a waveform having intersymbol interference with amplitude ratios $P_1, P_2-\alpha P_1, \ldots, P_k-\alpha P_{k-1}, \ldots, P_N-\alpha P_{N-1}, -P_N$ wherein a is a value of real number in a range of $0\alpha<1$, k is an integer indicating bit time, $P_1, P_2, \ldots, P_k, \ldots,$ and $P_N$ are real or integer numbers with the same sign or polarity, and $P_1$ and $P_N$ are non-zero numbers and $N \geq 2$ at each bit time, and
wherein said reproduced signal outputted from said noise-whitening matched filter is supplied to a maximum-likelihood decoder so as to be data-reproduced.

18. A magnetic recording/reproducing apparatus according to claim 17, wherein the noise-whitening matched filter includes a plurality of partial response equalization units defined by different impulse response waveforms, and
wherein a reproduced signal from said reproducing head is supplied to said plurality of partial response equalization units so as to be waveform-equalized in said partial response equalization units.

19. A magnetic recording/reproducing apparatus according to claim 18, wherein at least one of said different impulse response waveforms has no direct current frequency component, or intersymbol interference defined with $A_1+A_2+A_3 \ldots +A_k \ldots +A_N=0$, or intersymbol interference with a=1.

20. A magnetic recording/reproducing apparatus according to claim 18, wherein at least one of said different impulse response waveforms has a full direct current frequency component, or intersymbol interference with intersymbol interference values $A_1, A_2, A_3, \ldots, A_k, \ldots, A_N$ where all of $A_1, A_2, A_3, \ldots, A_k, \ldots, A_N$ have the same sign, or intersymbol interference with $\alpha=0$.

21. A magnetic recording/reproducing apparatus according to claim 17, wherein one of different impulse response waveforms is selected and set in said noise-whitening matched filter, and
wherein said reproduced signal from said reproducing head is supplied to said noise-whitening matched filter so as to be waveform-equalized.

22. A magnetic recording/reproducing apparatus according to claim 21, wherein at least one of said different impulse response waveforms has no direct current frequency component or intersymbol interference defined with $A_1+A_2+A_3 \ldots +A_k \ldots +A_N=0$, or intersymbol interference with a=1.

23. A magnetic recording/reproducing apparatus according to claim 21, wherein at least one of said different impulse response waveforms has a full direct current frequency component, or intersymbol interference with intersymbol interference values $A_1, A_2, A_3, \ldots, A_k, \ldots, A_N$ where all of $A_1, A_2, A_3, \ldots, A_k, \ldots, A_N$ have the same sign, or intersymbol interference with $\alpha=0$.

24. A magnetic recording/reproducing apparatus according to claim 16, wherein the noise-whitening matched filter includes a plurality of partial response equalization units defined by different impulse response waveforms, and
wherein a reproduced signal from said reproducing head is supplied to said plurality of partial response equalization units so as to be waveform-equalized in said partial response equalization units.

25. A magnetic recording/reproducing apparatus according to claim 24, wherein at least one of said different impulse response waveforms has no direct current frequency component, or intersymbol interference defined with $A_1+A_2+A_3 \ldots +A_k \ldots +A_N=0$, or intersymbol interference with a=1.

26. A magnetic recording/reproducing apparatus according to claim 24, wherein at least one of said different impulse response waveforms has a full direct current frequency component, or intersymbol interference with intersymbol interference values $A_1, A_2, A_3, \ldots, A_k, \ldots, A_N$ where all of $A_1, A_2, A_3, \ldots, A_k, \ldots A_N$ have the same sign, or intersymbol interference with $\alpha=0$.

27. A magnetic recording/reproducing apparatus according to claim 16, wherein one of different impulse response waveforms is selected and set in said noise-whitening matched filter, and
wherein said reproduced signal from said reproducing head is supplied to said noise-whitening matched filter so as to be waveform-equalized.

28. A magnetic recording/reproducing apparatus according to claim 27, wherein at least one of said different impulse response waveforms has no direct current frequency component or intersymbol interference defined with $A_1+A_2+A_3 \ldots +A_k \ldots +A_N=0$, or intersymbol interference with a=1.

29. A magnetic recording/reproducing apparatus according to claim 27, wherein at least one of said different impulse response waveforms has a full direct current frequency component, or intersymbol interference with intersymbol interference values $A_1, A_2, A_3, \ldots, A_k, \ldots, A_N$ where all of $A_1, A_2, A_3, \ldots, A_k, \ldots, A_N$ have the same sign, or intersymbol interference with $\alpha=0$.

30. A magnetic recording/reproducing apparatus according to claim 15, wherein the noise-whitening matched filter includes a plurality of partial response equalization units defined by different impulse response waveforms, and
wherein a reproduced signal from said reproducing head is supplied to said plurality of partial response equalization units so as to be waveform-equalized in said partial response equalization units.

31. A magnetic recording/reproducing apparatus according to claim 30, wherein at least one of said different impulse response waveforms has no direct current frequency component, or intersymbol interference defined with $A_1+A_2+A_3\ldots+A_k\ldots+A_N=0$, or intersymbol interference with a=1.

32. A magnetic recording/reproducing apparatus according to claim 30, wherein at least one of said different impulse response waveforms has a full direct current frequency component, or intersymbol interference with intersymbol interference values $A_1, A_2, A_3, \ldots, A_k, \ldots, A_N$ where all of $A_1, A_2, A_3, \ldots, A_k, \ldots, A_N$ have the same sign, or intersymbol interference with $\alpha=0$.

33. A magnetic recording/reproducing apparatus according to claim 15, wherein one of different impulse response waveforms is selected and set in said noise-whitening matched filter, and
wherein said reproduced signal from said reproducing head is supplied to said noise-whitening matched filter so as to be waveform-equalized.

34. A magnetic recording/reproducing apparatus according to claim 33, wherein at least one of said different impulse response waveforms has no direct current frequency component or intersymbol interference defined with $A_1+A_2+A_3\ldots+A_k\ldots+A_N=0$, or intersymbol interference with a=1.

35. A magnetic recording/reproducing apparatus according to claim 33, wherein at least one of said different impulse response waveforms has a full direct current frequency component, or intersymbol interference with intersymbol interference values $A_1, A_2, A_3, \ldots, A_k, \ldots, A_N$ where all of $A_1, A_2, A_3, \ldots, A_k, \ldots, A_N$ have the same sign, or intersymbol interference with $\alpha=0$.

36. A magnetic recording/reproducing apparatus, comprising a perpendicular magnetic recording medium and a reproducing head,
wherein a reproduced signal outputted from said reproducing head is processed through a partial response equalization circuit having a function of a noise-whitening matched filter having a frequency characteristic so that a low-frequency component of said reproduced signal including a direct current component is partially suppressed but not completely cut off through said partial response equalization circuit having said noise-whitening matched filter function,
wherein said reproduced signal outputted from said partial response equalization circuit having said noise-whitening matched filter function is supplied to a maximum-likelihood decoder so as to be data-reproduced,
wherein said partial response equalization circuit having said noise-whitening matched filter function includes a plurality of partial response equalization units having different direct current frequency component passing characteristics respectively, and
wherein a reproduced signal from said reproducing head is supplied to said plurality of partial response equalization units so as to be waveform-equalized in said partial response equalization units.

37. A magnetic recording/reproducing apparatus according to claim 36, wherein at least one of said different direct current frequency component passing characteristics is a cut-off characteristic of a direct current frequency.

38. A magnetic recording/reproducing apparatus according to claim 36, wherein at least one of said different direct current frequency component passing characteristics has a characteristic such that a low frequency component of said reproduced signal including a direct current component is fully passed.

39. A magnetic recording/reproducing apparatus, comprising a perpendicular magnetic recording medium and a reproducing head,
wherein a reproduced signal outputted from said reproducing head is processed through a partial response equalization circuit having a function of a noise-whitening matched filter having a frequency characteristic such that a low-frequency component of said reproduced signal including a direct current component is partially suppressed but not completely cut off through said partial response equalization circuit having said noise-whitening matched filter function,
wherein said reproduced signal outputted from said partial response equalization circuit having said noise-whitening matched filter function is supplied to a maximum-likelihood decoder so as to be data-reproduced,
wherein one of a plurality of different direct current frequency component passing characteristics is selected and set in said partial response equalization circuit having said noise-whitening matched filter function, and
wherein said reproduced signal from said reproducing head is supplied to said partial response equalization circuit having said noise-whitening matched filter function so as to be waveform-equalized.

40. A magnetic recording/reproducing apparatus according to claim 39, wherein at least one of said plurality of different direct current frequency component passing characteristics is a cut-off characteristic of a direct current frequency.

41. A magnetic recording/reproducing apparatus according to claim 39, wherein at least one of said plurality of different direct current frequency component passing characteristics has a characteristic such that a low frequency component of said reproduced signal including a direct current component is fully passed.

42. A magnetic recording/reproducing signal processing circuit for a magnetic recording/reproducing apparatus comprising a perpendicular magnetic recording medium and a reproducing head,
wherein a reproduced signal outputted from said reproducing head is processed through a partial response equalization circuit having a function of a noise-whitening matched filter having a frequency characteristic so that a low-frequency component of said reproduced signal including a direct current component is partially suppressed but not completely cut off through said partial response equalization circuit, and
wherein said reproduced signal outputted from said partial response equalization circuit is supplied to a maximum-likelihood decoder so as to be data-reproduced.

43. A magnetic recording/reproducing signal processing circuit according to claim 42, wherein reproduced waveforms responding to a pair of the two closest recording transitions recorded on said recording medium at a shortest bit length interval are outputted as a waveform having intersymbol interference with intersymbol interference values $A_1, A_2, A_3, \ldots, A_k, \ldots, A_N$ wherein k is an integer indicating bit time, and $A_1$ and $A_N$ are non-zero numbers with opposite signs: $A1+A2+A3\ldots+A_k\ldots+A_N \neq 0$ and $N \geq 2$ at each bit through said partial response equalization circuit, or as a dipulse waveform having asymmetrical amplitudes with opposite polarities through said partial response equalization circuit, and wherein said outputted waveforms are supplied to said maximum-likelihood decoder so as to be data-reproduced.

44. A magnetic recording/reproducing signal processing circuit according to claim 43, wherein said reproduced waveform responding to a pair of the closest two recording transitions recorded on said recording medium at a shortest bit length interval are outputted as a waveform having intersymbol interference with amplitude ratios $P_1$, $P_2$-$\alpha$ $P_1$, ..., $P_k$-$\alpha P_{k-1}$, ..., $P_N$-$\alpha P_{N-1}$, -$\alpha P_N$ wherein a is a value of real number in a range of $0<\alpha<1$, k is an integer indicating a bit time, $P_1, P_2, \ldots, P_k, \ldots$, and $P_N$ are real numbers with the same sign, and $P_1$ and $P_N$ are non-zero numbers and $N>2$ at each bit time through said partial response equalization circuit, and wherein said outputted waveforms are supplied to said maximum-likelihood decoder so as to be data-reproduced.

45. A magnetic recording/reproducing signal processing circuit according to claim 44, wherein said partial response equalization circuit comprises: an operation circuit which operates to subtract a signal value obtained in a manner so that each input signal supplied to said equalization circuit is delayed by a predetermined bit time and the delayed input signal is increased by a times, from said input signal and a predetermined waveform processing circuit.

46. A magnetic recording/reproducing signal processing circuit according to claim 44, wherein a value of a parameter a not smaller than 0.1 is used.

47. A magnetic recording/reproducing signal processing circuit according to claim 42, comprising a plurality of partial response equalization circuits having different direct current frequency component passing characteristics respectively or a plurality of partial response equalization circuits defined by different values of parameter a respectively, wherein a reproduced signal from said reproducing head is supplied to said plurality of partial response equalization circuits so as to be waveform-equalized in said partial response equalization circuits.

48. A magnetic recording/reproducing signal processing circuit according to claim 42, wherein one of a plurality of different direct current frequency component passing characteristics or one of a plurality of different values of parameter a is selected and set in said partial response equalization circuit, and wherein said reproduced signal from said reproducing head is supplied to said partial response equalization circuit so as to be waveform-equalized.

49. A magnetic recording/reproducing signal processing circuit according to claim 48, wherein at least one of said plurality of different direct current frequency component passing characteristics is a cut-off characteristic of a direct current frequency component, or at least one of different values of said parameter a satisfies a condition of $\alpha=1$.

50. A magnetic recording/reproducing signal processing circuit according to claim 49, wherein a signal for adjusting or controlling a circuit disposed in a pre-stage of said partial response equalization circuit is referred to from a circuit in a post-stage of said partial response equalization circuit having said cut-off characteristic of said DC frequency component, or from a circuit in a post-stage of said response equalization circuit having said parameter a satisfying $\alpha=1$.

51. A magnetic recording/reproducing signal processing circuit according to claim 42, wherein an information data bit sequence to be recorded is converted into a data bit sequence so that a maximum number m of consecutive recording transitions recorded at a shortest bit length interval on said recording medium is limited to a finite value, and then said converted data bit sequence is recorded on said recording medium.

52. A magnetic recording/reproducing signal processing circuit according to claim 51, wherein said maximum number m of the consecutive recording transitions is limited to be not larger than 4.

* * * * *